US012314591B1

United States Patent
Ajmera et al.

(10) Patent No.: US 12,314,591 B1
(45) Date of Patent: May 27, 2025

(54) TECHNIQUES FOR DYNAMIC RESOURCE BALANCING WITH ASYNCHRONOUS REPLICATION

(71) Applicant: Dell Products L.P., Hopkinton, MA (US)

(72) Inventors: Mayank Ajmera, Cary, NC (US); Vamsi K. Vankamamidi, Hopkinton, MA (US); Vikram A. Prabhakar, Apex, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/641,996

(22) Filed: Apr. 22, 2024

(51) Int. Cl.
  *G06F 3/06* (2006.01)
(52) U.S. Cl.
  CPC .......... *G06F 3/0644* (2013.01); *G06F 3/0607* (2013.01); *G06F 3/065* (2013.01); *G06F 3/0685* (2013.01)
(58) Field of Classification Search
  CPC ...... G06F 3/0644; G06F 3/0607; G06F 3/065; G06F 3/0685
  See application file for complete search history.

(56) References Cited

U.S. PATENT DOCUMENTS

| | | | |
|---|---|---|---|
| 2019/0102269 A1* | 4/2019 | Abouelwafa | ....... H04L 67/1095 |
| 2024/0143554 A1* | 5/2024 | Kaushik | ................ G06F 16/128 |
| 2024/0256123 A1* | 8/2024 | Moore | .................. G06F 3/0608 |

OTHER PUBLICATIONS

U.S. Appl. No. 18/401,916, filed Jan. 2, 2024, entitled Tracking Writes and Snapshot Creation/Deletion in Memory to Improve Asynchronous Replication Performance and Support Lower Recovery Point Objectives (RPOS), David Bernard, et al., (135394.01).
U.S. Appl. No. 18/361,399, filed Jul. 28, 2023, entitled Managing Transient Snapshots for Reduced Metadata Writes, Vamsi K. Vankamamidi et al., (133148.01).

* cited by examiner

*Primary Examiner* — Khoa D Doan
(74) *Attorney, Agent, or Firm* — Muirhead and Saturnelli, LLC

(57) ABSTRACT

Techniques can include: configuring stretched volumes for asynchronous replication; specifying replication settings denoting selected replication service levels of asynchronous replication optimizations for the stretched volumes; performing asynchronous replication for the stretched volumes based on the replication settings; monitoring a current amount denoting an amount of a resource that is free and available for use; and responsive to determining that the current amount is below a minimum, performing a corrective action to increase the current amount, wherein the corrective action includes: changing a replication setting for a stretched volume from a first replication service level to a second replication service level, wherein the second replication service level is expected to consume less of the resource than the first replication service level when performing asynchronous replication for the stretched volume.

19 Claims, 15 Drawing Sheets

| Service level 802 | Optimizations performed 804 |
|---|---|
| High | Write tracking performed to track writes and store the list of tracked writes in cache.<br><br>Transient snapshots and dirty write data held in the log without flushing. Thus all data to be replicated is held in the cache until replicated. |
| Medium | Write tracking performed to track writes and store the list of tracked writes in cache.<br><br>Transient snapshots can be flushed from the log to mapper.<br><br>All data (dirty and clean) to be replicated is held in cache until replicated. |
| Low | Write tracking performed to track writes and store the list of tracked writes in cache.<br><br>Transient snapshots can be flushed from the log to mapper.<br><br>At least some of the data to be replicated is not in cache and results in a read cache miss where the data is then read from BE non-volatile storage.<br><br>Dirty data that get flushed from the log and can be a candidate for removal or eviction from the cache. |
| Off | No optimization of the low RPO replication is performed (e.g., low RPO replication processing can be disabled). An alternative asynchronous replication technique can be performed. In at least one embodiment, the snapshot difference technique can be performed when in off mode or service level. |

FIG. 9

TECHNIQUES FOR DYNAMIC RESOURCE BALANCING WITH ASYNCHRONOUS REPLICATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume; specifying a plurality of current replication settings for the plurality of stretched volumes, wherein each of the plurality of replication settings denotes one of a plurality of replication service levels selected for a corresponding one of the plurality of stretched volumes, wherein each of the plurality of replication service levels denotes a different level of optimization performed for asynchronous replication; performing asynchronous replication for the plurality of stretched volumes in accordance with the plurality of replication current replication settings; monitoring resource consumption of one or more resources consumed during asynchronous replication processing, wherein said monitoring includes: monitoring a first amount of a first resource of the one or more resources, wherein the first amount denotes a current amount of the first resource that is free and available for use; and responsive to determining that the first amount of the first resource is below a first minimum threshold, performing a corrective action to increase the current amount of the first resource that is free, wherein the plurality of replication service levels includes a first replication service level and a second replication service level, and wherein the corrective action includes: changing a first current replication setting of the plurality of current replication settings for a first stretched volume of the plurality of stretched volumes from the first replication service level to the second replication service level, wherein the second replication service level is expected to consume less of the first resource than the first replication service level when performing asynchronous replication for the first stretched volume.

In at least one embodiment, the plurality of replication service levels can include a high service level, a medium service level, a low service level, and an off service level, and wherein the first replication service level can be the high service level and the second service level can be any of: the medium service level, the low service level, and the off service level. The first resource can be any of: i) log storage space for a persisted log of recorded commands and operations, and ii) write cache space in a volatile memory cache for storing write data having corresponding recorded writes I/Os that have not yet been flushed from a log. The step of changing can modify the first current replication setting for the first stretched volume from the first replication level, denoting the high service level, to the second replication level, denoting the medium service level. The step of specifying can specify the high service level as the first current replication setting for the first stretched, and can result in performing optimizations for asynchronous replication of said first stretched volume at the high service level. The optimizations can include: performing write tracking in memory or cache for said first stretched volume, wherein said write tracking tracks locations of said first stretched volume that are written to between successive transient snapshots of the respective source volume of said first stretched volume; retaining, in a log, a first log record to create a first transient snapshot of the respective source volume of said first stretched volume; retaining, in the log, first write records of first write I/Os directed to said first stretched volume, where said first write I/Os are recorded in the log after the first log record; and retaining, in a cache of the source system until replicated, all data which is written to said respective source volume of said first stretched volume and which is to be asynchronously replicated to the target system. Processing can include: recording, in the log, a second log record to delete the first transient snapshot of said first stretched volume, where the second log record is included in the log after the first write records of the first write I/Os; and while the first log record to create the first transient snapshot and the second log record have not been flushed from the log, invaliding the first transient snapshot responsive to detecting the second log record, wherein said invalidating thereby cancels creation of the first transient snapshot.

Invalidating the first transient snapshot can allow the first write records to be flushed from the log. Subsequent to said invalidating, processing can flush the first write records from the log to the respective source volume of said first stretched volume. The first log record can be recorded in the log responsive to a first command or request to create the first transient snapshot, wherein the first command or request can be from a replication service that performs asynchronous replication for said first stretched volume when the first current replication setting for the first stretched volume is set to the high service level. The second log record can be recorded in the log responsive to a second command or request to delete the first transient snapshot, wherein the second command or request can be from the replication service that performs asynchronous replication for said first stretched volume when the first current replication setting for the first stretched volume is set to the high service level.

In at least one embodiment, the step of changing can include setting the first current replication setting for the first stretched volume to the medium service level and results in performing optimizations for asynchronous replication of said first stretched volume at the medium service level. The optimizations can include: performing write tracking in memory or cache for said first stretched volume, wherein said write tracking tracks locations of said first stretched volume that are written to between successive transient snapshots of the respective source volume of said first stretched volume; and retaining, in a cache of the source system until replicated, all data which is written to said respective source volume of said first stretched volume and which is to be asynchronously replicated to the target system. The medium service level can allow transient snapshots of the respective source volume of said first stretched volume to be flushed from a log. processing can include: recording, in the log, a first log record to create a first transient snapshot of the respective source volume of said first stretched volume; flushing the first log record from the log; and responsive to said flushing the first log record, creating a first replication related snapshot of the respective source volume of said first stretched volume, including creating and/or updating one or more metadata pages for the first replication related snapshot. The first log record can be recorded in the log responsive to a first command or request to create the first transient snapshot, wherein the first command or request can be from a replication service that performs asynchronous replication for said first stretched volume. After flushing the first log record and creating the first replication related snapshot of the respective source volume of said first stretched volume, processing performed can include: the replication service issuing a second command or request to delete the first replication related snapshot; and responsive to the second command or request, deleting the first replication related snapshot, including deleting and/or updating one or more metadata pages for the first replication related snapshot.

In at least one embodiment, the first resource can be read cache space in a volatile memory cache for storing data having corresponding recorded writes I/Os that have been flushed from a log. Processing can include modifying the first current replication setting for the first stretched volume from the first replication setting, denoting any of the high service level and the medium service level, to the second replication level, denoting the low service level. Specifying the low service level as the first current replication setting for the first stretched volume can result in performing optimizations for asynchronous replication of said first stretched volume, wherein the optimizations can include performing write tracking in memory or cache for said first stretched volume, wherein said write tracking tracks locations of said first stretched volume that are written to between successive transient snapshots of the respective source volume of said first stretched volume. The low service level can allow transient snapshots of the respective source volume of said first stretched volume to be flushed from a log. The low service level can allow first content of the respective source volume of the first stretched volume, that is to be replicated, to be evicted from a cache of the source system such that at least some of the first content to be replicated is not in the cache and results in a read cache miss. Responsive to the read cache miss, the at least some of the first content to be replicated can be obtained from backend non-volatile storage.

In at least one embodiment, processing can include: recording, in the log, a first log record to create a first transient snapshot of the respective source volume of said first stretched volume; flushing the first log record from the log; and responsive to said flushing the first log record, creating a first replication related snapshot of the respective source volume of said first stretched volume, including creating and/or updating one or more metadata pages for the first replication related snapshot. The first log record can be recorded in the log responsive to a first command or request to create the first transient snapshot, wherein the first command or request can be from a replication service that performs asynchronous replication for said first stretched volume. After flushing the first log record and creating the first replication related snapshot of the respective source volume of said first stretched volume, processing can be performed that includes: the replication service issuing a second command or request to delete the first replication related snapshot; and responsive to the second command or request, deleting the first replication related snapshot, including deleting and/or updating one or more metadata pages for the first replication related snapshot.

In at least one embodiment, the first resource can be write tracking cache space in a volatile memory cache for storing locations of volumes that have been modified in corresponding asynchronous replication cycles. Processing can include modifying the first current replication setting for the first stretched volume from the first replication setting, that is any of the high service level, the medium service level and the low service level, to the second replication level, denoting the off service level that turns off all optimizations for asynchronous replication.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 9 is an example of various service levels of low RPO (recovery point objective) replication for asynchronous replication that can be performed in at least one embodiment in accordance with the techniques of the present disclosure.

DETAILED DESCRIPTION OF EMBODIMENT(S)

Figure 1:
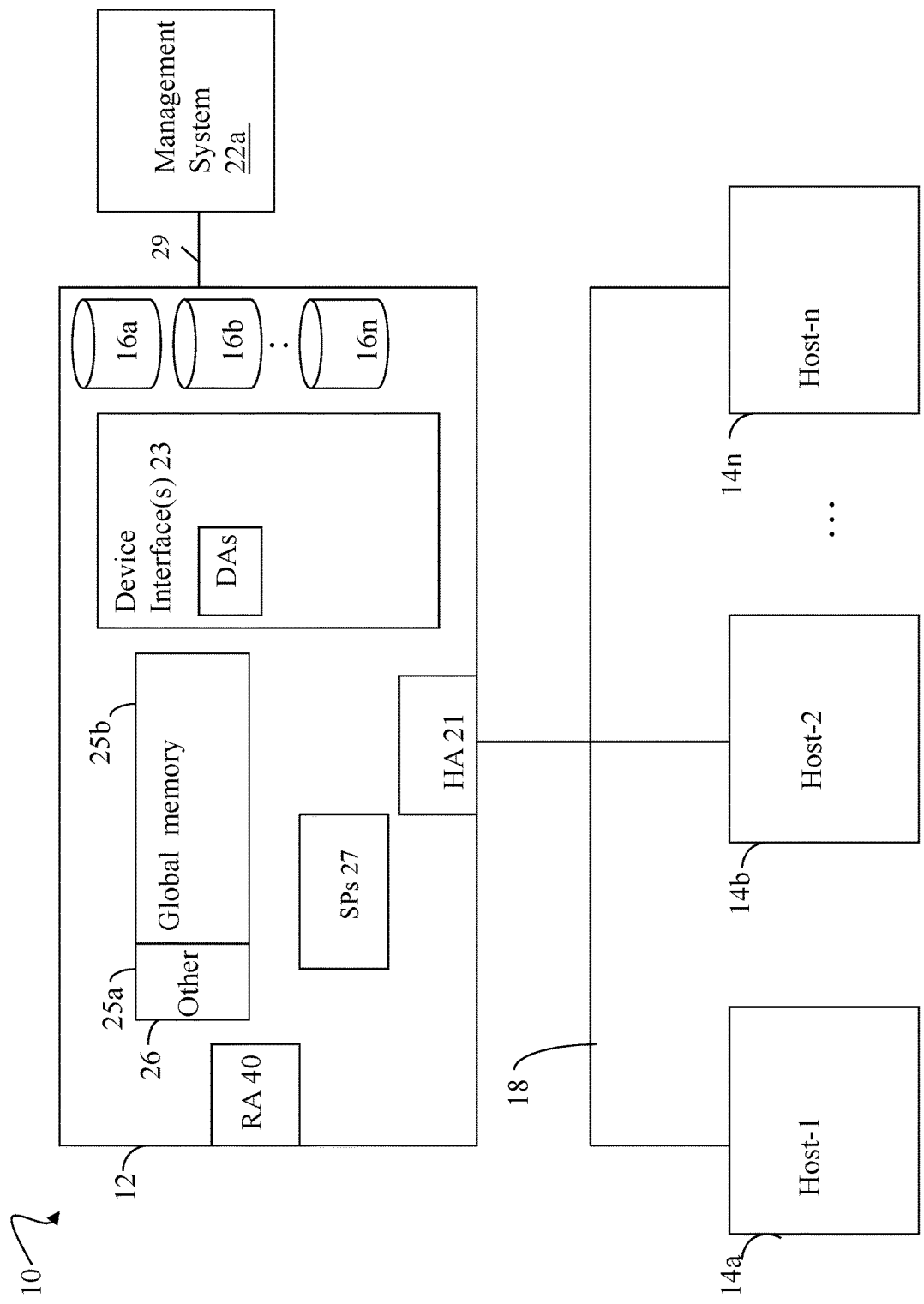
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system and the target storage system can present a single data storage resource or object, such as a volume or logical device, to a client, such as a host. The volume or other storage resource or object can be configured as a stretched volume or resource, where both the source storage object of the source system and the target storage object of the target system are configured to have the same identity from the perspective of the external host. Thus the stretched volume or resource configured from a pair of volumes or resources, such as the source storage object of the source storage system and the target storage object of the target storage system, can be configured for remote replication that can be further characterized as one-way replication where, as noted above, writes to the source storage object are automatically replicated in a continuous ongoing manner to the target storage object. The stretched volume, resource or object can be exposed over paths going to both the source storage system and the target storage system, but where the host can only issue I/Os to the stretched volume over paths to the source storage system but not the target storage system.

One mode or methodology of one-way remote replication can be referred to as asynchronous remote replication (sometimes referred to as asynchronous replication) where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typical, for example, from hours to a number of minutes.

In at least one existing system, asynchronous replication can capture data changes or differences to be copied from the source storage object to the target storage object in repeated cycles using a snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can be referred to as replication related snapshots in that they are used only internally in the source system for asynchronous replication purposes. The source system can determine a difference in content between the current snapshot N of the source storage object and the immediately prior snapshot N−1 of the source storage object, where the data changes replicated to the target system correspond to the difference in content between the snapshots N and N−1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. In at least one version of the snapshot difference technique (sometimes referred to as the legacy version), resource intensive processing can be performed that includes creating the two successive snapshots N−1 and N, and then subsequently deleting the two snapshots in a very short time period solely for the purposes of replication. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

It can be desirable to support specifying an even smaller time granularity for an RPO such as less than a minute or a number of seconds. It can further be desirable to provide for efficient asynchronous replication resulting in a low RPO that is a number of seconds or generally less than a minute.

Accordingly, described in the following paragraphs are techniques that can be used for efficient replication in at least one embodiment. Additionally in at least one embodiment, the techniques of the present disclosure provide for efficient asynchronous replication of a configured stretched storage object from a corresponding source storage object of a source system or volume and a corresponding target storage object or volume of a target system. In at least one embodiment, asynchronous replication can be performed using techniques described herein that results in a near zero RPO or more generally a very low RPO. Furthermore in at least one embodiment, the techniques of the present disclosure can be used to perform dynamic resource balancing where the near zero RPO or low RPO replication can be performed across multiple configured stretch storage objects having corresponding asynchronous replication sessions that can each operate in one of multiple defined replication service levels (sometimes also referred to herein as service levels or levels). In at least one embodiment, the techniques of the present disclosure can dynamically adjust and vary the particular service level in which corresponding asynchronous replication is performed for an associated stretched volume based, at least in part, on consumption of resources used in connection with optimizations of the low RPO techniques described herein. In at least one embodiment, the defined service levels can provide for operating a corresponding replication session for a configured stretched volume with one or more selected low RPO optimizations turned on or off.

In at least one embodiment, an asynchronous replication session can provide for efficient asynchronous replication for a stretched storage object that results in a very small RPO that is on the scale of a number of seconds or generally less than a minute. For example in at least one embodiment, the RPO can be less than 30 seconds and, as noted above, can sometimes be referred to herein as "near zero" or low RPO replication using a "near zero" RPO due to the very small RPO. With near zero or low RPO replication in at least one embodiment, snapshots can be taken in a continuous ongoing manner such that when the data changes of a current replication cycle have been replicated or copied from the source to the target system, the source system can take a next snapshot of the source storage object and then replicate the data changes of the next replication cycle to the target system. The foregoing can be performed in an ongoing manner in at least one embodiment. In at least one embodiment, rather than taking replication related snapshots at a frequency based on a defined RPO value or setting, the near zero or low RPO replication can perform asynchronous replication by continually taking snapshots of the source storage object in an ongoing manner and then replicating data changes of the latest replication cycle. A replication cycle can occur between two successive replication related snapshots of a source volume where the writes made to the source volume between the time period when the two successive snapshots are taken are included in the replication cycle. Thus with near zero replication for a stretched storage object in at least one embodiment, once the current replication cycle of data changes is copied or replicated from the source system to the target system, the source system can immediately commence the next replication cycle without regard to taking snapshots at a defined frequency.

In at least one embodiment, a replication related snapshot can denote a snapshot taken for replication related purposes such as for asynchronous replication using the near zero or low RPO replication techniques described herein. In at least one embodiment, replication related snapshots can be used internally by the source storage system to capture data changes that are copied or replicated in ongoing replication cycles to the target system for a stretched storage object or resource.

In at least one embodiment, the low RPO or near zero replication as discussed in more detail below can provide a low RPO by utilizing limited or finite resources of the storage system, where such resources can include cache resources and the log resources. In at least one embodiment, writes and other operations can be recorded in a persisted log and also in a volatile memory cache. Once the write or other operation has been recorded in the persisted log, an acknowledgement regarding completion of the operation can be returned to the client that sent the operation. In times of heavy system workload such as high I/O workload periods with respect to stretched volumes or storage objects configured for low RPO replication, there can be contention and increased demand for the cache and log resources. As the I/O load on the stretched volumes or storage objects configured for low RPO replication increases, the free or available amounts of the resources, such as the log and cache resources, can fall to undesirable low levels below specified corresponding minimum thresholds. As a result, the system can be unable to sustain the low RPO targets for all such stretched volumes configured for low RPO replication causing, for example, at least several of the stretched volumes to have increased corresponding measured or observed RPOs above specified maximum compliant RPO targets or thresholds.

In at least one embodiment, based on resource consumption such as consumption of cache and/or log resources, the techniques of the present disclosure can proactively and dynamically adjust the service levels of low RPO replication for selected stretched volumes in efforts to maintain RPO compliance for a maximum number of stretched volumes. When resource consumption and pressure increases during periods of high I/O workload, stretched volumes operating at a first corresponding service level of relatively high resource consumption by asynchronous replication can be configured to operate at a relatively lower service level allowing for less resource consumption in connection with asynchronous replication. When resource consumption and pressure decreases from periods of a high I/O workload to a lower I/O workload, stretched volumes operating at a low corresponding level limiting resource consumption by asynchronous replication can be configured to operate at a higher level allowing for greater resource consumption in connection with asynchronous replication. In at least one embodiment, dynamically adjusting and varying the service levels of corresponding stretched volumes configured for low RPO replication can provide for varying the degree of resources consumed during asynchronous replication with a finer granularity of control and resource balancing than enabling or disabling low RPO replication completely.

In at least one embodiment of the present disclosure, a low RPO or near zero RPO replication technique can perform multiple optimizations including: write tracking; using transient snapshots or snaps that can be retained in the log without flushing until deleted from the log; and holding or maintaining data to be replicated in a cache of the source system until the data has been asynchronously replicated to the target system.

In at least one embodiment, the techniques of the present disclosure can determine data changes or writes that are replicated in a replication cycle without performing the expensive snapshot difference technique such as noted above where the snapshots are actually flushed from the log and created such as by a mapper component discussed elsewhere herein. In at least one embodiment using the low RPO replication technique, a cache or caching layer can perform write tracking of tagged writes where the cache can identify all writes tagged with a particular tracking identifier (ID). The particular tracking ID can uniquely identify tracked writes of a particular replication cycle between two successive snapshots of a source volume. All writes tracked with the particular tracking ID can denote the data changes in the replication cycle for a particular source volume. Thus in at least one embodiment, the above-noted write tracking can be used to determine corresponding locations in the source volume of the data changes to be replicated to the target system. Thus such tracked data changes of the source storage object on the source system can denote source volume locations or offsets of written or changed data that is replicated from the source to the remote target system in a single replication cycle and then applied to the corresponding target storage object.

In at least one embodiment, the low RPO replication techniques of the present disclosure can include retaining the changed or written data (to be replicated in connection with asynchronous replication for the stretched storage object) in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, the techniques of the present disclosure can utilize a mechanism for write tracking of write I/Os in the data path where a cache or caching layer, such as a transactional caching layer, can track tagged write I/Os (e.g., tagged with a tracking ID). In at least one embodiment where the stretched object is a stretched volume, the cache or caching layer of the source storage system can track metadata or information about the tagged write I/Os directed to the stretched object (and thus a corresponding source storage object), where the information can include a volume, offset (e.g., logical block address or LBA), and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular replication cycle for the source storage object.

In at least one embodiment, the data changes or differences between two successive replication related snapshots N−1 and N of the source object can be identified by the tracked writes having a particular tracking ID. In at least one embodiment, data changes corresponding to successive snapshots of the source object can be identified by tracked writes directed to the source object, where such tracked writes can be tagged with corresponding tracking IDs uniquely associated with corresponding replication cycles.

In at least one embodiment for a stretched volume configured for near zero replication that is one way asynchronous replication from a volume pair V1, V2, where V1 is the source volume on the source system and V2 is the target volume on the target system, the caching layer on the source system can track tagged write I/Os directed to the stretched volume, and thus V1, on the source system in connection with replication related snapshots for near zero or low RPO replication. In at least one embodiment, the tracked writes can denote a list of changed offsets or locations of V1 modified between successively taken replication-related snapshots of V1. The tracked writes can be stored as a list in a volatile memory cache of the source system. Low RPO replication techniques can then use the list of tracked writes as stored in cache to identify the content to be replicated from the source system to the target system without having to use a more resource intensive technique. Additionally in at least one embodiment, retaining the content or data of the tracked writes in cache until such content or data has been replicated allows the low RPO replication technique to efficiently retrieve the content or data to be replicated from cache, as opposed to the more costly and time consuming processing of reading the data or content to be replicated from backend (BE) non-volatile storage.

Thus in at least one embodiment, the low RPO technique can store the list of tracked writes in cache where the list identifies logical addresses of the content to be replicated. In at least one embodiment, the low RPO technique can traverse the list of tracked writes to identify logical addresses or locations of V1 to be replicated, where the content or data of such logical addresses or locations can also be retrieved efficiently from cache without incurring the expensive processing of a read cache miss.

In at least one embodiment in accordance with the techniques of the present disclosure, the low RPO techniques can further utilize transient snapshots that are successively and continuously taken replication related snapshots. In low RPO replication, replication related snapshots can be created and deleted in a relatively short amount of time. In at least one embodiment, a snapshot request corresponding to a request to create a replication related snapshot of the source volume V1 can be received at the source system. In at least one embodiment, a log on the source system can be used to record, in time order, write I/Os of V1 and other operations such as commands to create and delete snapshots including replication related snapshots of V1. In such an embodiment, a record denoting the replication related snapshot creation or request can be recorded in the log having a relative position or location with respect to recorded writes that are included in the particular snapshot. Thus the log can include records in a time ordered sequence denoting the order in which recorded operations are received and applied.

In at least one embodiment, the low RPO replication techniques can provide for retaining in the log replication related snapshot commands that create transient snapshots without flushing them from the log until deleted from the log. In at least one embodiment, transient snapshots can be created and delete by a replication service that performs the low RPO replication techniques. In this manner, the replication service can create a transient snapshot and then delete the transient snapshot when the service is done using the transient snapshot for its replication purposes. In at least one embodiment, the record of the log denoting the request to create or take the replication related snapshot can be marked as transient indicating that the particular snapshot created is a replication related or transient snapshot. In at least one embodiment, a transient flag or indicator of a log record for a create snapshot command can indicate that the log records corresponding to the snapshot and the snapshot's (dirty) write data be retained in the log and not flushed from the log until the snapshot has been deleted, as denoted by an entry recorded in the log for the delete snapshot operation. In at least one embodiment, once the low RPO technique has replicated content or write data of write I/Os received between successive transient snapshots N−1 and N from the source system to the target system, the log record of the transient snapshot N−1 can be deleted and the log records of write I/Os between transient snapshots N−1 and N can be flushed from the log. In at least one embodiment, the foregoing of retaining records for the transient snapshot in the log until deleted can be performed, for example, rather than incur additional performance penalties associated with flushing records of the transient snapshot creation and subsequent write I/Os from the log, and then performing processing to delete the transient snapshot after it has been flushed from the log and created.

In at least one embodiment, flushing records of the transient snapshot from the log can be an expensive operation and can include creating and storing corresponding metadata for the transient snapshot. Furthermore, subsequent flushed writes to the source volume occurring after taking the transient snapshot of the source volume can also result in write splits causing additional metadata updates. In at least one embodiment, deleting the flushed transient snapshot can be an expensive operation in that the corresponding metadata for the snapshot is deleted and/or updated. Furthermore, processing can also be performed to undo any previously performed operations in connection with the write splits. In at least one embodiment, a write split can be performed with respect to a metadata page and includes allocating a new metadata page where the content of an existing metadata page is copied to the new metadata page. In connection with taking a snapshot of a source volume, the source volume and the snapshot include the same content initially and can thus share one or more same metadata pages. Subsequently, writes can be applied to the source volume resulting in differences in stored content of the source volume and snapshot. As a result of the writes, a write split can be performed where, prior to the writes, the snapshot and the source volume may share the same metadata page. Subsequent to applying the writes such as to the source volume, a first metadata page that is shared by both the snapshot and the source volume may be modified to reflect the writes applied to the source volume. However, prior to modifying the existing first metadata page for use with the source volume writes, a write split operation can be performed to preserve or duplicate the existing first metadata page content in a new page for use with the snapshot. Thus retaining a transient snapshot in the log (e.g., retaining in the log a record to create a transient snapshot) until deleted can avoid expensive processing, such as write splits, that can be associated with a flushed transient snapshot.

In at least one embodiment, dirty write data can generally be retained in cache until the BE non-volatile storage has been updated to persistently store the write data, whereby the write data can now be characterized as clean and can be a candidate for eviction from the cache. As may be needed in at least one embodiment, records of the transient snapshot can be flushed from the log such as, for example, if there is an insufficient amount of log space and/or cache. However in at least one embodiment, even though write data of the transient snapshot may be flushed from the log, write data can be retained in, and not evicted from, the cache even after being flushed from the log and characterized as clean.

In at least one embodiment, log records, such as records of transient snapshots and writes recorded in the persistent log, can also be stored in a volatile memory cache. While recorded writes of the log remain in the log, the write data can remain in the cache as dirty data that has not yet been flushed. Such dirty write data can be retained in the cache and may not be a candidate for removal or eviction. In at least one embodiment as part of normal processing in the data path, once the corresponding log records of the write data have been flushed from the log, the write data of the cache can be marked as clean, where clean data of the cache can be a candidate for removal or eviction. In at least one embodiment of low RPO replication, even if write data is flushed from the log, the write data can be retained in the cache of the source system until replicated to the target system.

In at least one embodiment, near zero or low RPO replication with respect to a stretched volume or resource can denote one way asynchronous replication from a source volume of a source system to a corresponding target volume of a target system. In at least one embodiment, low RPO replication for a stretched volume can replicate source volume data changes to the target system continuously such that as soon as one replication cycle ends, the next replication cycle begins. With low RPO replication in at least one embodiment, the cache can track tagged writes that are tagged with a tracking ID, and can store the list of tagged writes in cache. In at least one embodiment, tracking writes can include recording in cache information about the tagged writes such as volume, offset and length corresponding to the writes. In at least one embodiment, the tracking ID can be uniquely associated with a particular replication cycle of a particular source volume configured for near zero or low RPO replication. In this manner, querying the cache for tracked writes tagged with a particular tracking ID can denote the list of writes or data changes included in a particular corresponding replication cycle for a particular source volume. In at least one embodiment, low RPO replication can further include: retaining transient snapshots in the log; and retaining content to be replicated in the cache of the source system until such content has been replicated.

In at least one embodiment for low RPO replication, there can be 4 defined service levels: high, medium, low and off. In the high service level, all optimizations of the low RPO replication can be performed and can be on. In at least one embodiment, the high service level can correspond to a normal setting for low RPO replication. In the high service level in at least one embodiment: write tracking can be performed where the list of changes or writes to be replicated for a particular snapshot can be stored in cache; transient snapshots can be held in the log without flushing until deleted; and content to be replicated can remain in the cache until replicated. Thus in the high service level in at least one embodiment, all content or data to be replicated can be dirty and can remain in cache until replicated to the target system.

In the medium service level in at least one embodiment: write tracking can be performed where the list of changes or write to be replicated for a particular snapshot can be stored in cache; transient snapshots can be flushed from the log; and all content or data to be replicated can remain in the cache until replicated. In the medium service level, the data to be replicated that is retained in the cache can be clean (e.g., if the corresponding records of write I/Os that write the data to be replicated have been flushed from the log) or dirty (e.g., if the corresponding records of write I/O that write the data to be replicated have not yet been flushed from the log).

In the low service level in at least one embodiment: write tracking can be performed where the list of changes or write to be replicated for a particular snapshot can be stored in cache; transient snapshots can be flushed from the log; and at least some of the content or data to be replicated is not stored in the cache and thus results in a read cache miss when requested for replication by low RPO replication processing. In at least one embodiment in the low service level, write data having corresponding log records flushed from the log is clean and such clean write data is not guaranteed to be retained in the cache and can be evicted. If there is a read cache miss, the requested data of a logical address needed for replication can be read from BE nonvolatile storage such as using mapping information of the chain of metadata pages that maps the logical address to a corresponding physical address or location on BE nonvolatile storage, where the physical address or location denotes a storage location containing the content of the logical address.

In the off service level in at least one embodiment, no optimizations of the low RPO replication technique are performed. For a source volume in the off service level in at least one embodiment, write tracking can be unable to keep up with the incoming I/O load directed to the source volume. In the off service level in at least one embodiment, an alternative asynchronous replication technique can be performed rather than the low RPO replication technique. In the off service level in at least one embodiment, no optimizations of the low RPO replication technique are performed. For example in at least one embodiment when in the off service level, the alternative asynchronous replication technique performed can be the more time consuming legacy snapshot difference technique that includes creating and/or updated corresponding metadata for the snapshots.

In at least one embodiment, the foregoing 4 service levels can be ranked from highest replication related resource consumption to lowest replication related resource consumption as follows: high, medium, low and off. Thus as an amount of a free, unused or available resource decreases below a specified minimum threshold, one or more source volumes configured for asynchronous replication using the low RPO techniques can be generally transitioned from a first service level to a second service level, where the first service level can be ranked as having a higher replication related resource consumption than the second service level.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
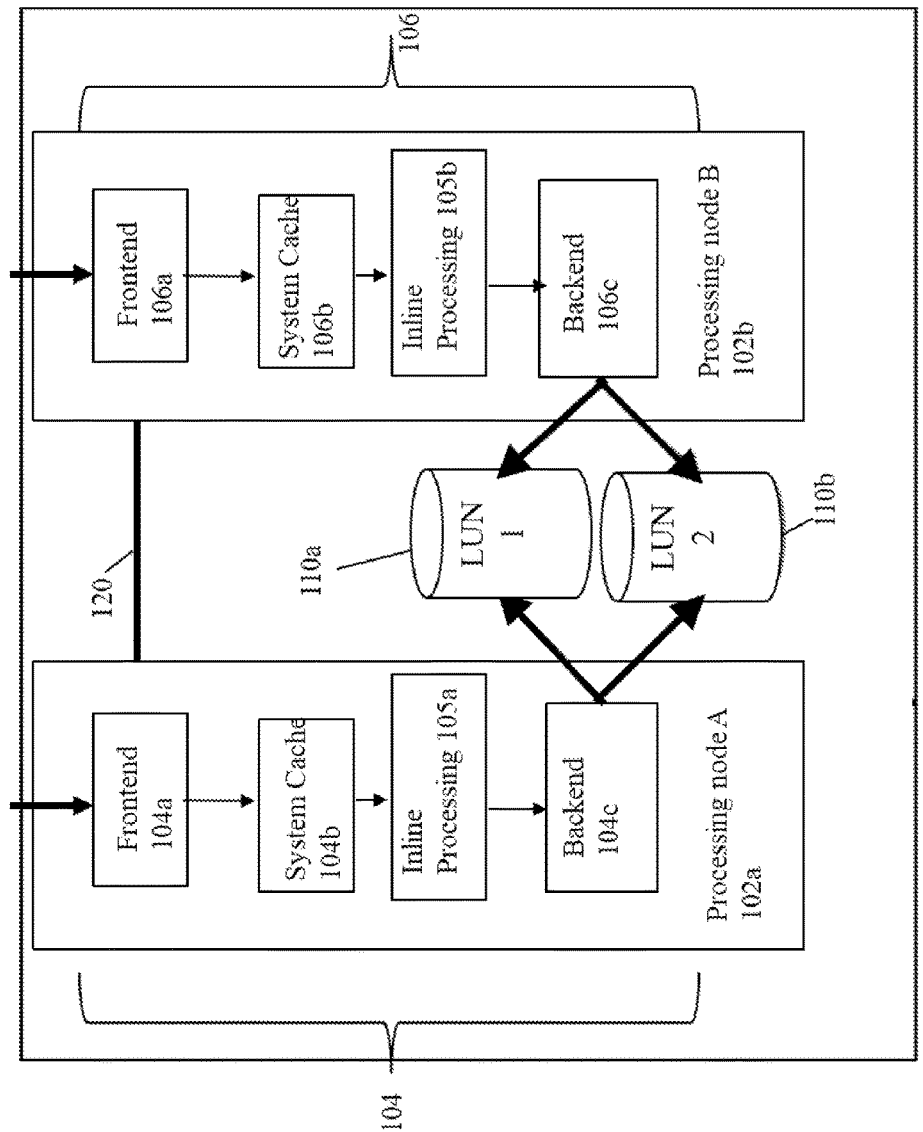
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment as discussed in more detail elsewhere where herein, the log can also be used to log or record other operations such as operations to create and delete snapshots of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
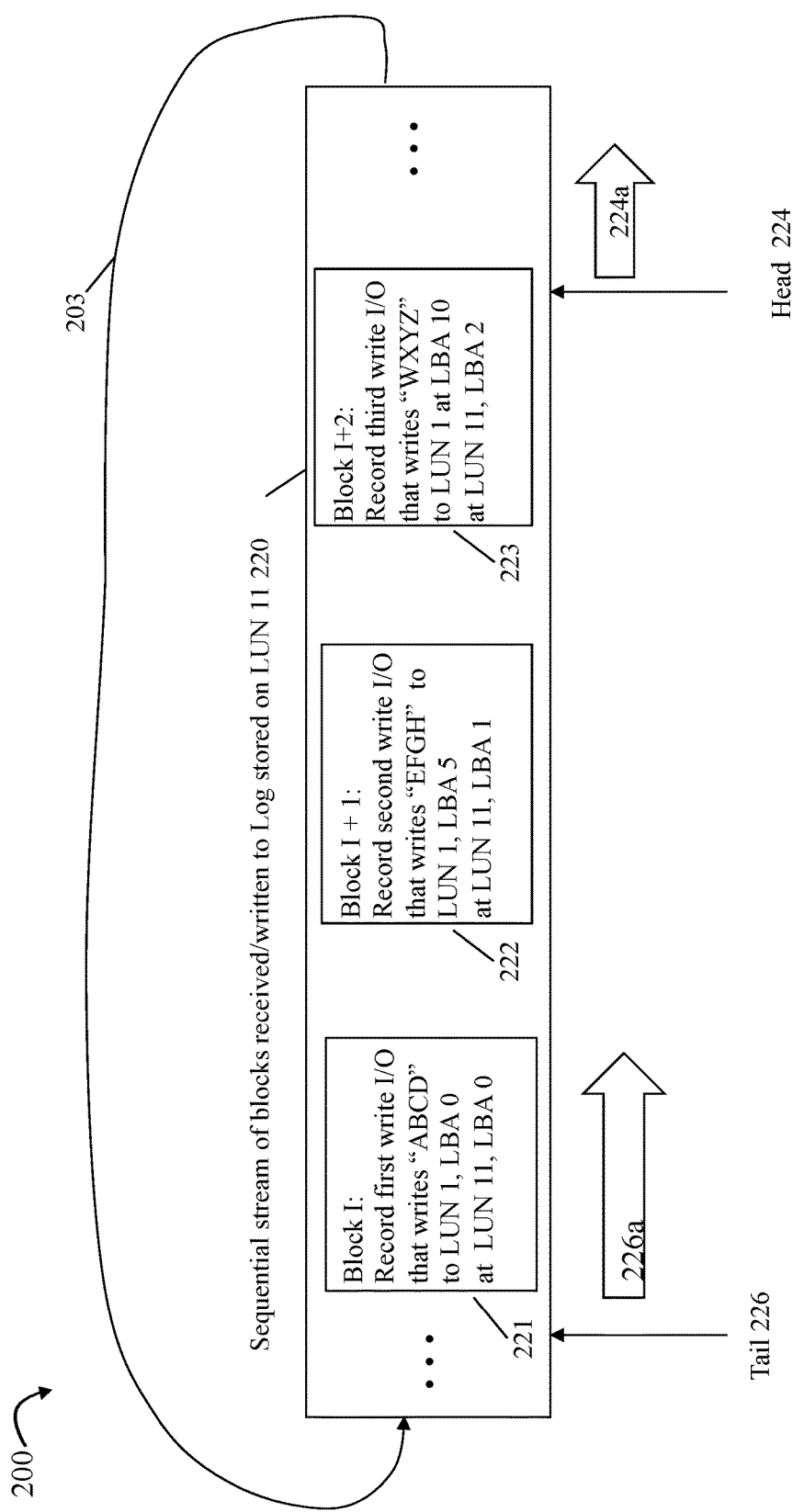
FIGS. 2B, 2C, 2D and 6 are examples illustrating use of a log in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
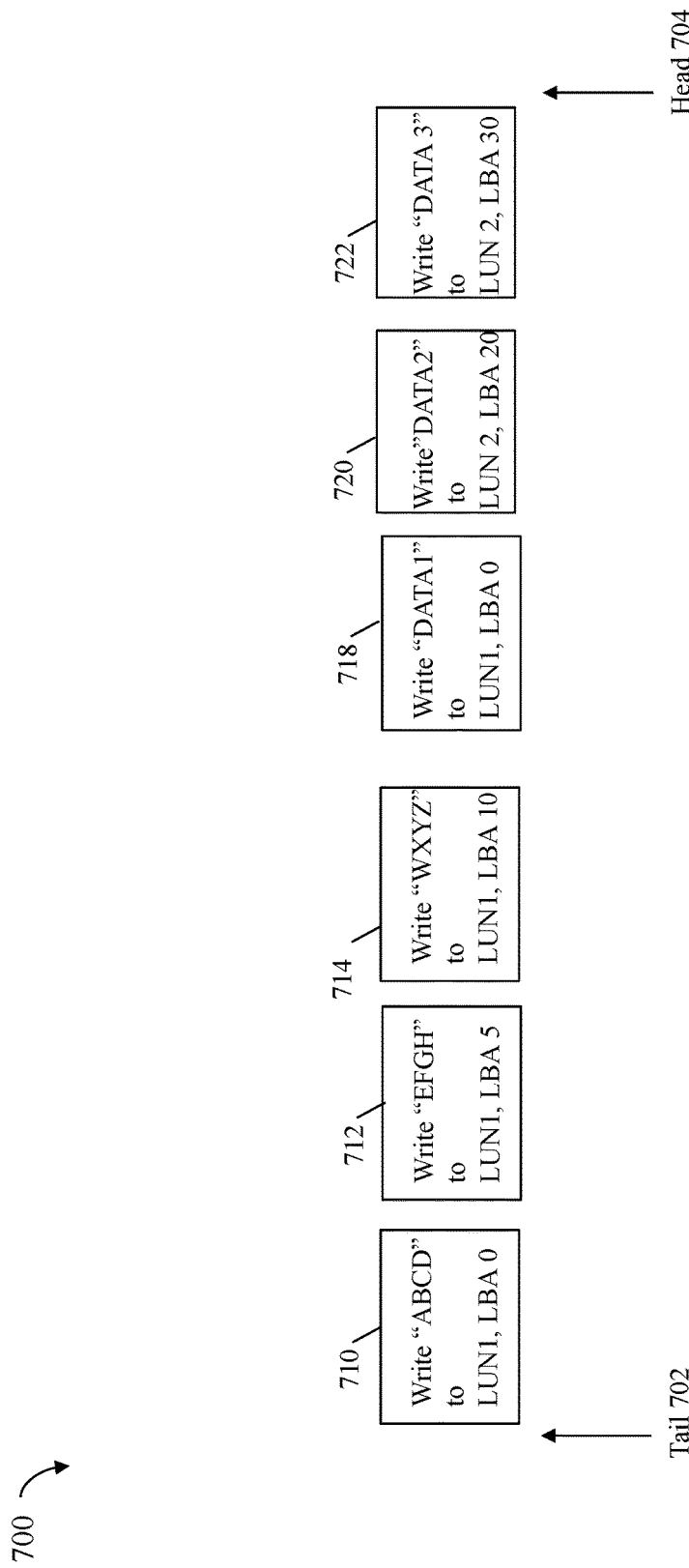

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
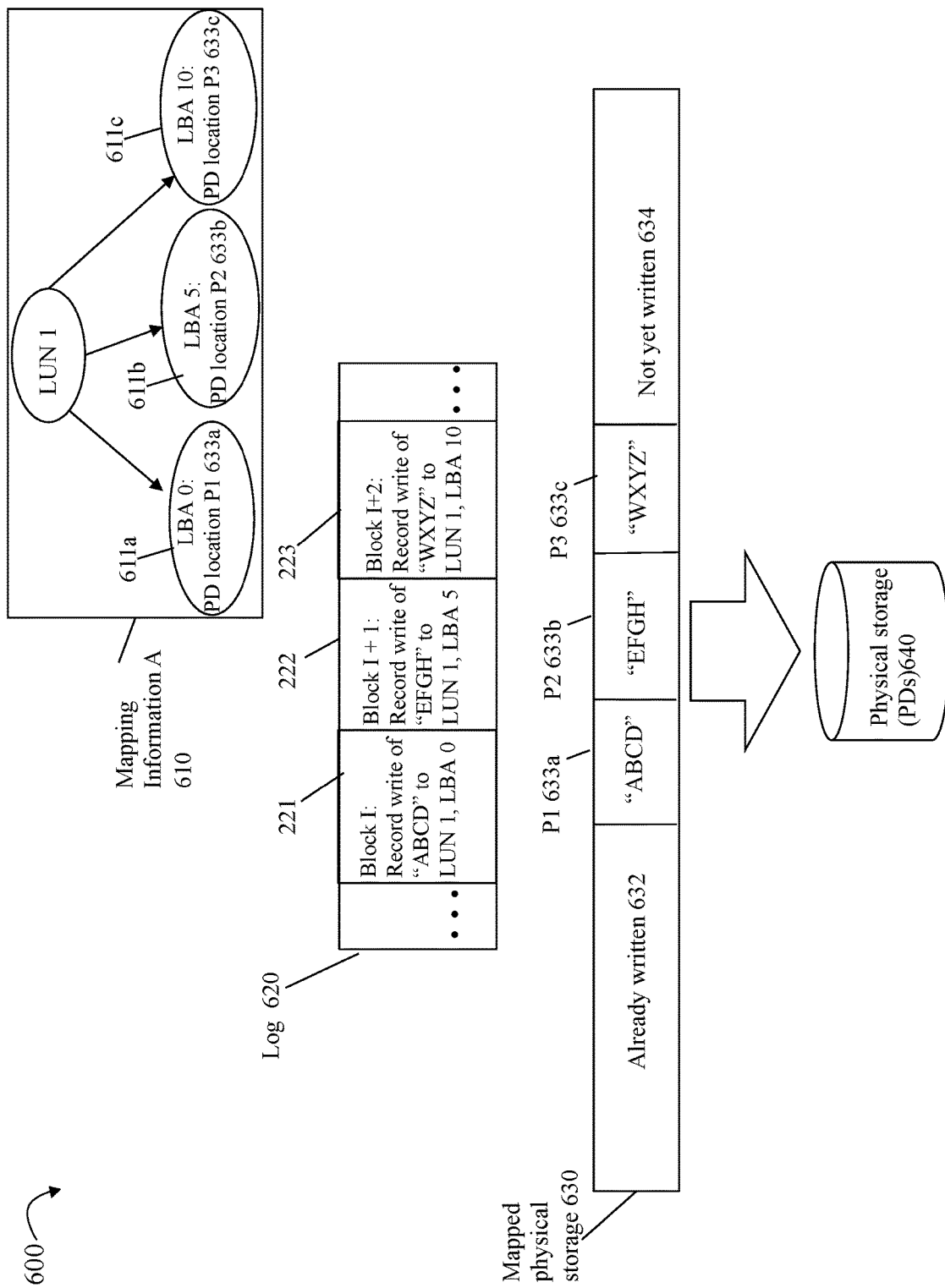

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
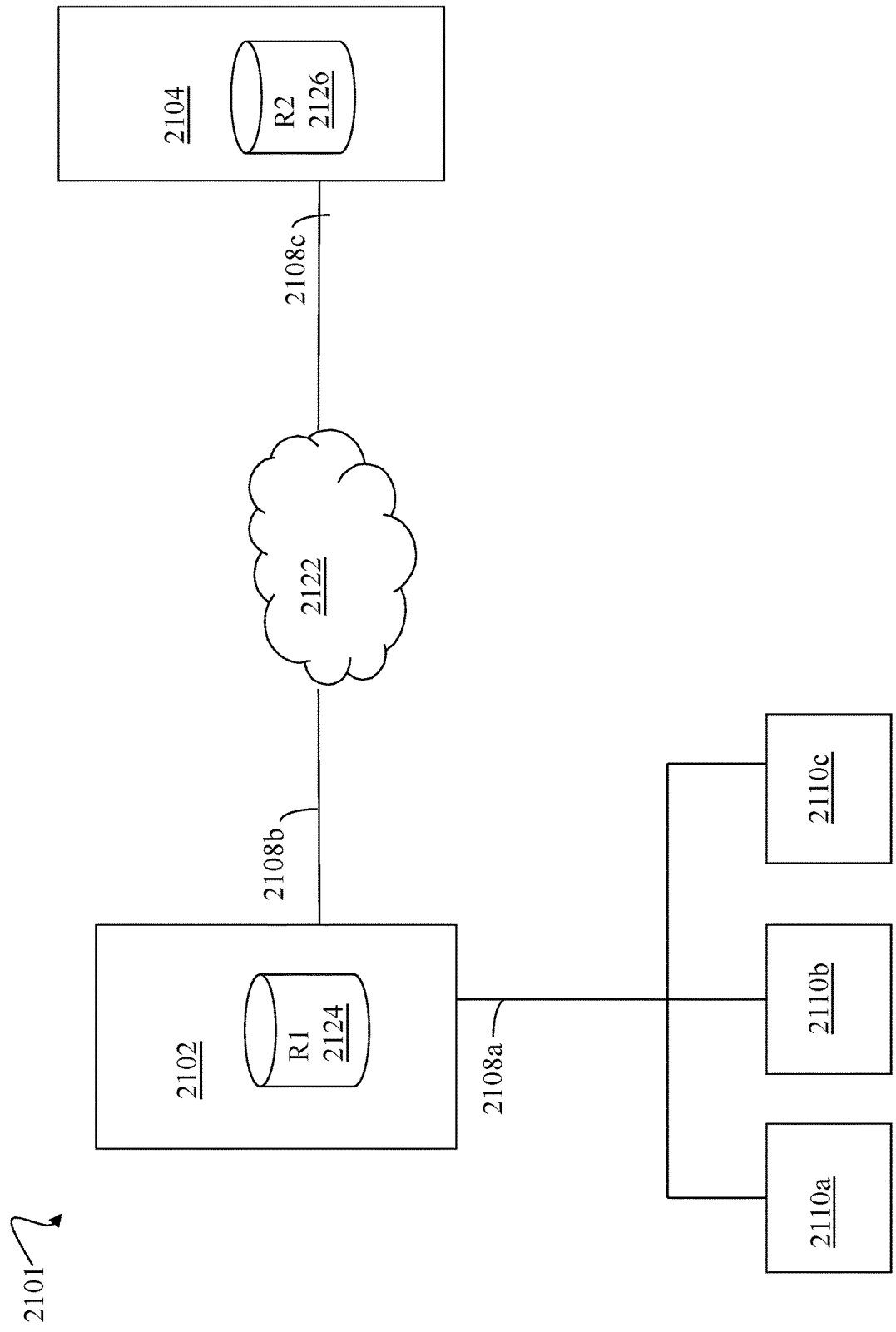
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108*a* which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110a can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110a regarding completion of the write. Thus, the acknowledgement sent from the system 2102 to the host 2110a regarding completion of the write is sent independent of any replication or communication of the write to the remote R2 system 2104. Additionally, the RRF operating in the asynchronous mode can replicate or propagate the write across an established connection or link (more generally referred to as the remote replication link or link) such as over 2108b, 2122, and 2108c, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
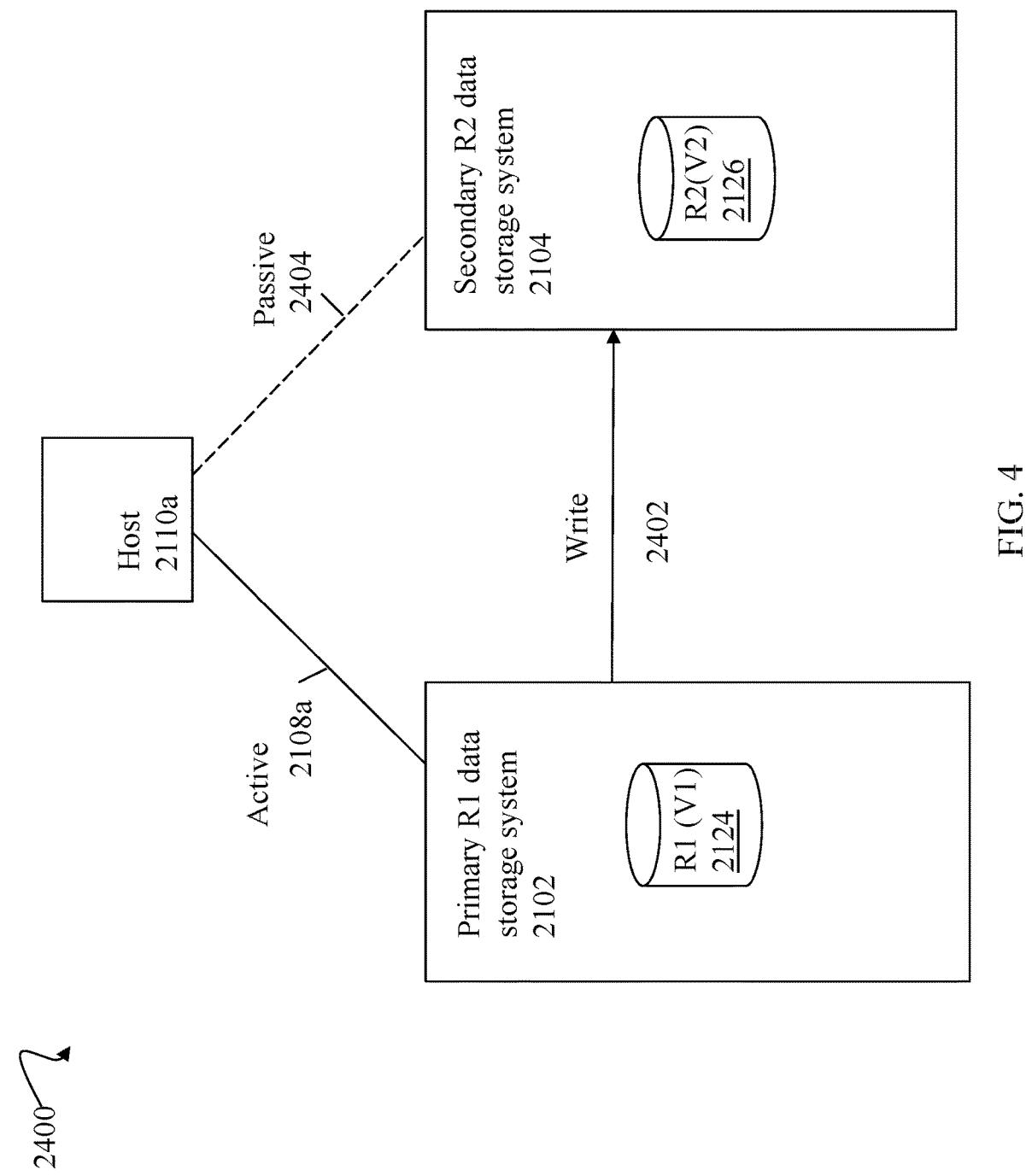
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with asynchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be asynchronously replicated to the R2 system 2104.

In at least one embodiment of the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A for I/Os over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A. Alternatively, recovery processing can include copying content from R2 device 2126 of the R2 system 2104 to the R1 device 2124 of the R1 system 2102 to thereby restore R1 2124. Subsequent to restoring R1 2124, the host 2110a can resume issuing I/Os to R1 2124 over path 2108a where any write I/Os directed to R1 2124 can be replicated and applied in an asynchronous manner to R2 2126 on the storage system 2104.

In at least one embodiment, the pair of devices or volumes including the R1 device 2124 and the R2 device 2126 can be configured as the same single volume or LUN, such as LUN A, to expose the two different devices or volumes (e.g., V1 or R1 2124; V2 or R2 2326), on two different data storage systems 2102, 2104 to the host 2110a as the same single volume or LUN. Thus, from the view of the host 2110a, the same LUN A is exposed and thus discoverable over the two paths 2108a and 2404, where R1/V1 and R2/V2 are both configured as the same logical volume or LUN A and where R1/V1 and R2/V2 both have the same identity as presented, viewed or exposed to an external host. However in at least one embodiment, host I/Os directed to LUN A sent over active path 2108a can be serviced, and where host I/Os directed to LUN A may not be sent over passive path 2404 and may not be serviced.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

Consistent with discussion above, the RRF or remote replication facility can perform asynchronous replication of a stretched volume, resource or object in at least one embodiment. The asynchronous replication configuration can be generally as discussed herein such as the asynchronous remote replication configuration as in FIG. 4. In at least one embodiment, the asynchronous replication configuration can be a near zero or low RPO replication configuration of a stretched volume, where the RRF performs processing of the low RPO replication technique.

Consistent with discussion above, the asynchronous replication of the stretched volume can be performed using the low RPO techniques discussed herein. The low RPO replication techniques in at least one embodiment can perform several optimizations that provide for the very low or near zero RPO achieved for a stretched volume or storage object. A stretched volume can be configured for asynchronous replication, in particular for low RPO replication, from a volume pair (V1, V2), where V1 denotes the source volume on the source system, and where V2 denotes the target volume on the target system.

Below is an initial discussion of further details regarding the various optimizations that can be performed by the low RPO replication technique in at least one embodiment in accordance with the present disclosure. Subsequently, there is a discussion regarding dynamically adjusting or varying low RPO replication service levels using the techniques of the present disclosure in at least one embodiment, where low RPO replication sessions for corresponding stretched volumes can be in one of 4 defined service levels.

In at least one embodiment in accordance with the techniques of the present disclosure, processing can be performed to monitor resource consumption and determine free or available amounts of the cache and log resources. In at least one embodiment in response to free or available amounts of the cache and/or log resources falling below corresponding specified minimum thresholds, processing can be performed to dynamically adjust the service level of one or more source volumes of stretched volumes configured for low RPO replication from a higher service level to a lower service level, where the low RPO replication technique operating at the higher service level can be expected to consume more cache and/or log resources than the low RPO replication technique operating at the lower service level. In at least one embodiment in response to free or available amounts of the cache and/or log resources rising above corresponding minimum specified thresholds, processing can be performed to dynamically adjust the service level of one or more source volumes of stretched volumes configured for low RPO replication from a lower service level to a higher service level, where the low RPO replication technique operating at the higher service level can be expected to consume more cache and/or log resources than the low RPO replication technique operating at the lower service level.

In the following paragraphs, examples can be provided in embodiments where the stretched storage object is a stretched volume or logical device. More generally, the techniques of the present disclosure can be used with other types of storage objects.

The foregoing and other aspects of the techniques of the present disclosure are described in more detail in the following paragraphs.

Figure 5A:
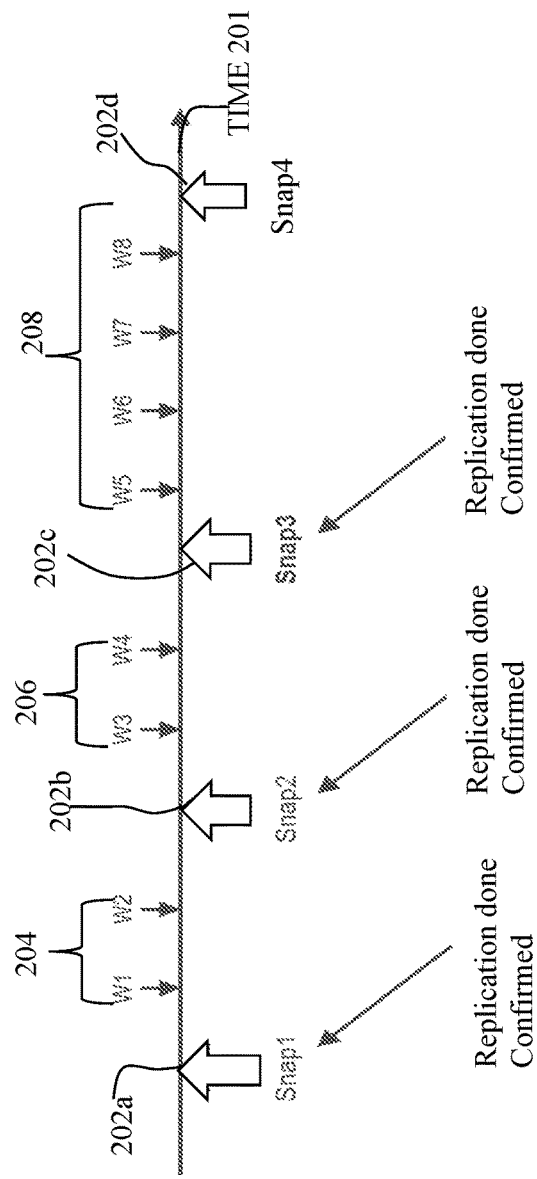
FIG. 5A is an example illustrating determining data differences for a replication configuration in at least one embodiment in accordance with the techniques of the present disclosure.

Referring to FIG. 5A, shown is an example 200 illustrating use of replication related or transient snapshots in connection with asynchronous replication, such as a low RPO replication for a stretched volume, in at least one embodiment in accordance with the techniques of the present disclosure.

The example 200 illustrates replication related snapshots 202a-d of a storage object such as a source volume of a source storage system taken at various points in time along a timeline 201. The snapshot snap1 202a is taken at a first point in time P1 and can be marked as a replication related snapshot. The snapshot snap2 202b is taken at a second point in time P2 (subsequent to taking snap1 202a at P1) and can be a marked as a replication related snapshot. The snapshot snap3 202c is taken at a third point in time P3 (subsequent to taking snap2 202b at P2) and can be marked as a replication related snapshot. The snapshot snap4 202d is taken at a fourth point in time P4 (subsequent to taking snap3 202c at P3).

In at least one embodiment, each of the replication related snapshots 202a-d can also be marked or flagged as a transient snapshot.

The writes W1 and W2 of 204 denote the writes occurring between taking snapshots 202a and 202b, whereby writes of 204 denote data changes between snapshots 202a-b. The writes W3 and W4 of 206 denote the writes occurring between taking snapshots 202b and 202c, whereby the writes of 206 denote data changes between snapshots 202b-c. The writes W5-W8 of 208 denote the writes occurring between taking snapshots 202c and 202d whereby the writes of 208 denote data changes between the snapshots 202c-d.

The writes 204 can denote the replicated writes of a single asynchronous replication cycle between snapshots 202a-b; the writes 206 can denote the replicated writes of a single asynchronous replication cycle between snapshots 202b-c; and the writes 208 can denote the replicated writes of a single asynchronous replication cycle between the snapshots 202c-d.

Consistent with discussion elsewhere in at least one embodiment in accordance with the techniques of the present disclosure, write tracking can be performed by a caching layer or cache to determine the replicated writes of each replication cycle corresponding to a particular tracking ID that uniquely identifies a particular replication cycle of the particular source volume. Processing can be performed to extract data changes of a replication cycle based on the tracked writes with the particular tracking ID as identified by the cache or caching layer.

Consistent with other discussion herein in connection with at least one embodiment of the low RPO replication, records of the writes 204 can remain in the cache until the writes 204 have been replicated from the source system to the target system whereby the replication of such subsequent writes 204 following the snap 202a are confirmed as committed on the target system. Records of the writes 206 can remain in the cache until the writes 206 have been replicated from the source system to the target system whereby the replication of such subsequent writes 206 following the snap 202b are confirmed as committed on the target system. Records of the writes 208 can remain in the cache until the writes 208 have been replicated from the source system to the target system whereby the replication of such subsequent writes 208 following the snap 202c are confirmed as committed on the target system.

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, records of the transient snapshots as recorded in the log can remain in the log and not flushed until deleted, such as by a remote replication facility or RRF performing asynchronous replication using the low RPO replication techniques described herein.

In at least one embodiment, processing can be performed such as by a cache or caching layer to generally track changed data locations of the source volume or storage object on the source system, where the contents of the changed locations is what need to be replicated to the target volume or storage object of the target system. In at least one embodiment, such data changes can be read by the source system, replicated to the target system, and written to the target volume of the target system on each replication cycle. In the normal processing of the low RPO technique where all optimizations of the low RPO technique are enabled and applied, the data to be replicated can be retained in cache and thus read from cache.

In at least one embodiment, processing of the low RPO replication technique can include continually taking replication related snapshots or snaps of a source volume V1; tracking writes of each replication cycle between two successive replication related snapshots using a unique tracking ID; using metadata or information recorded for the tracked writes to determine a set or list of corresponding locations of V1 denoting locations of V1 that have been modified or written in a particular replication cycle; extracting data changes of the corresponding locations for the corresponding replication cycle; and replicating the data changes of the replication cycle from the source system to the target system. Additionally, as the data or writes between successive snapshots N−1 and N are replicated from the source system to the target system, the low RPO replication technique can further include deleting the replication related snapshot N−1; and also deleting or otherwise reusing the cache storage consumed for the list of tracked writes. If the replication related snapshot is in the log and thus deleted from the log, the writes subsequent to the deleted snapshot can now be flushed from the log. If the replication related or transient snapshot has been flushed from the log and is deleted after the log entry to create the snapshot has been flushed, deleting the replication related snapshot can include deleting any associated metadata of the deleted snapshot. If the replication related snapshot has been flushed from the log, records of subsequent writes may have also been flushed from the log but retained in cache until replicated. If the replication related snapshot has not been flushed from the log, records of the subsequent writes are also not flushed, where the write data of such subsequent writes is dirty and can remain in the cache until replicated and flushed.

In at least one embodiment, the data differences or changed content can be determined, replicated or written to the target system, and then applied to the corresponding target volume. In at least one embodiment, the list of locations having content to be replicated can be obtained from the list maintained in the cache by write tracking. The content or data replicated can be read from cache since in at least one embodiment of the low RPO replication technique, the content or data to be replicated for a particular replication cycle can remain in cache until replicated.

Figure 5B:
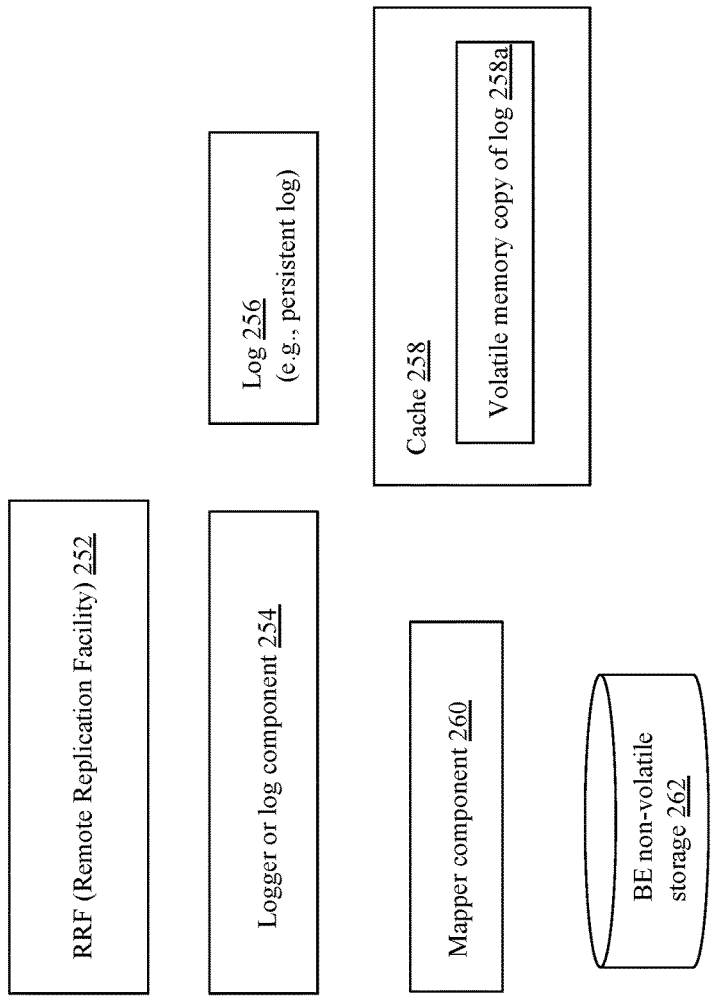
FIG. 5B is an example of components that can be included in a system in at least one embodiment of the techniques of the present disclosure.

Referring to FIG. 5B, shown is an example 250 of components on a storage system that can be used in an embodiment in accordance with the techniques of the present disclosure.

In at least one embodiment the components of 250 can be included in the source storage system configured to perform asynchronous replication using the low RPO techniques in accordance with the present disclosure.

The components 250 can include a remote replication facility or RRF 252, a logger or log component 254, a mapper component 260, a log 256 denoting a persistently stored log of recorded operations, a cache 258, and BE non-volatile storage 262. The cache 258 can generally be a volatile memory cache and can include a volatile memory copy 258a of the log 256. Put another way, in at least one embodiment, element 258a can denote an in-memory copy of the log 256, where the in-memory or volatile memory copy 258a can include the same information as the persistent log 256. In at least one embodiment, the copy 258a of the log can be accessed and used to perform processing described herein rather than the persistent copy 256 of the log. In at least one embodiment, the copy 258a of the log can have a corresponding layout and organization of content that can be different from the persisted log 256, where the organization of 258a can be designed for quicker retrieval, updating and/or management than that of the persisted log 256. In at least one embodiment, the persisted log 256 can be used in the event of system failure or reboot to repopulate the volatile memory copy 258a of the log. In at least one embodiment, committing a record or transaction to the log, such as part of ingest processing of a command or operation, can include storing corresponding records in both the persisted log 256 and the volatile memory copy 258a of the log. In at least one embodiment with a dual node system, committing a record or transaction to the log can also include communicating the committed or recorded operations between the peer nodes to ensure that both nodes have synchronized volatile memory copies of the log.

In at least one embodiment of a dual node system, each node can include node-local instances of 252, 254, 258, and 260. In at least one embodiment of a dual node system, there can be a single persistent log 256 accessed and used by both nodes. Additionally, the storage 262 can denote BE non-volatile storage accessed and used by both nodes.

The RRF 252 can be configured to perform asynchronous replication using the low RPO techniques of the present disclosure.

The mapper component 260, sometimes referred to as the mapper, can maintain mapping information of metadata pages used to map logical addresses, such as of user data or content, to corresponding physical addresses or locations of content stored at the logical addresses. The physical addresses or locations can correspond to storage locations in the BE non-volatile storage 262. Consistent with other discussion herein in at least one embodiment, the metadata pages can be organized in a hierarchal tree structure of multiple layers of metadata pages. In at least one embodiment, the hierarchical structure of multiple layers of metadata pages can include a layer of top MD pages, a layer of mid MD pages, a layer of leaf MD pages, where each top page can include pointers to multiple mid pages, each mid page can include multiple pointers to multiple leaf pages. Each leaf page can include multiple entries each associated with a logical address, where the leaf page entry for a logical address can include a reference, pointer, or address used to access a physical storage location of 262 containing content of the logical address. In at least one embodiment, the reference of the leaf page entry for a logical address can be an indirect pointer to the physical storage location of content stored at the logical address. In at least one embodiment, the mapping information mapping a logical address LA1 to a corresponding physical location PA1 of content stored at LA1 can include a chain of the metadata pages including top, mid and leaf MD pages, where the top page points to a mid page, and where the mid page points to a leaf page, and where an entry of the leaf page includes the indirect pointer to PA1. In at least one embodiment, flushing a recorded write I/O of the log where the write I/O writes content C1 to LA1 can include: storing C1 at PA1; and creating and/or updating the mapping information of the chain of metadata pages used to map LA1 to PA1.

In at least one embodiment, flushing a recorded command or operation to take a snapshot can also include allocating and/or updating metadata pages for the new snapshot. In at least one embodiment, write I/Os to a source volume can result in write splits with respect to metadata pages shared with a snapshot of the source volume, where a write split can resulting in allocating one or more new metadata pages to accommodate the snapshot and writes to the source volume. As a result, deleting the snapshot once it has been flushed from the log can include the expensive process of deleting and/or updating metadata pages corresponding to the snapshot and its writes. Thus in at least one embodiment, retaining a transient snapshot in the log until deleted can use additional cache and log resources for an extended period of time while also avoiding or omitting performing the expensive processing associated with deleting a snapshot after it has been actually created as a result of flushing the log entry of the create snapshot command from the log.

The log component 254 can be configured to: record operations, commands or requests in the log 256, 258a; enforce constraints and dependencies between various operations that can be recorded in the log; and control flushing of the log 256, 258a to the mapper component 260. In accordance with the techniques of the present disclosure, the log component 254 can be configured to delay flushing recorded commands or operations, such as a command or operation to take or create transient snapshots, based on an indicator, such as a transient flag (TF) setting of the command to take a transient snapshot of a source volume.

In at least one embodiment, ingest processing of a write I/O and a snapshot related command (e.g., to create a snapshot of a volume or storage object and/or delete an existing snapshot of a volume or storage object) can include recording (e.g., committing) the command or operation in the log. Once the foregoing is recorded in the log, an acknowledgement can be returned to the client or originator of the command or operation just recorded in the log. In at least one embodiment, the RRF 252 can be the client originating i) the command to create a transient or replication related snapshot and ii) the command to delete an existing transient or replication related snapshot. In at least one embodiment, write I/Os directed to a source volume configured for asynchronous replication using the low RPO techniques can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Figure 6:
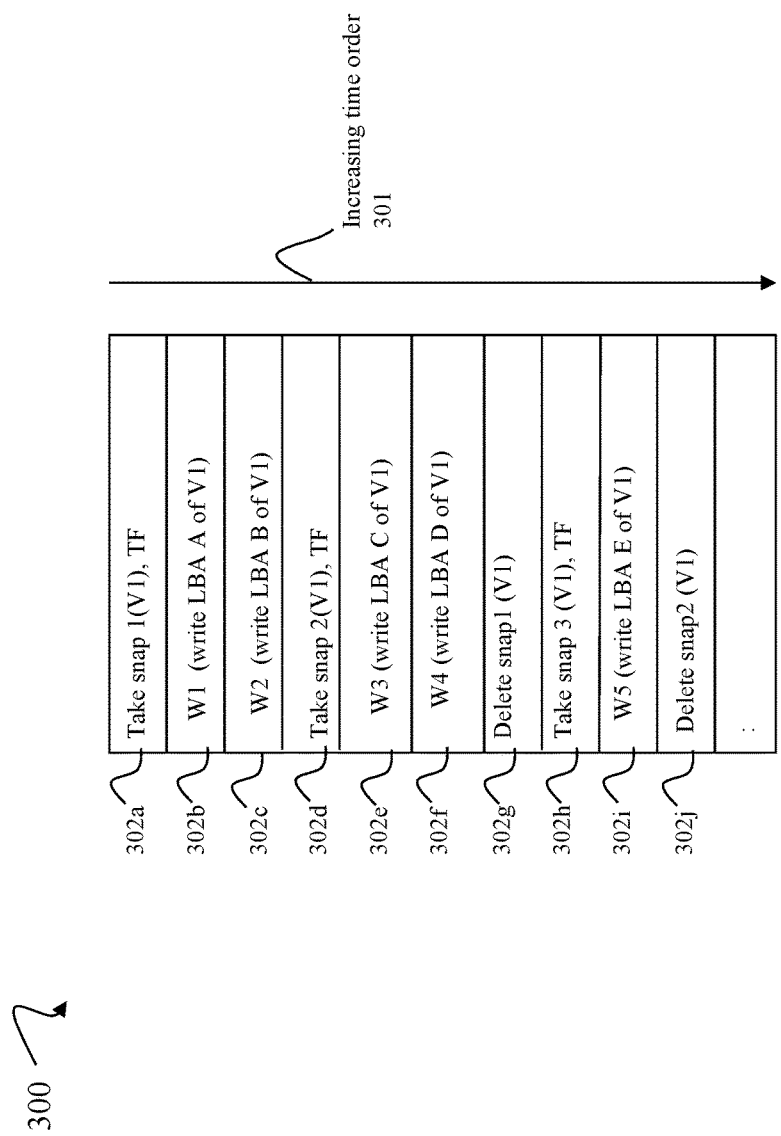

Referring to FIG. 6, shown is an example 300 illustrating use of the log in connection with recording transient or replication related snapshot operations and writes in at least one embodiment in accordance with the techniques of the present disclosure.

In the example 300, operations can be recorded as entries in the log in increasing time order as indicated by the arrow 301. Thus the records 302a-j denote operations, requests or commands recorded and committed to the log at various points in time in increasing time order.

Initially, a request or command to take or create a first transient or replication related snapshot, snap1, of the source volume V1, can be made by the RRF performing the low RPO replication techniques. The request to take snap1 of V1 is recorded in the log as record 302a, the transient flag (TF) is set for snap1 to signal to delay flushing the record 302a. In at least one embodiment, a log entry creating a snapshot can be viewed as a barrier record such that writes subsequent to the log entry for the create snapshot command are not flushed until the log entry for the create snapshot command is first flushed. Thus based on normal ordering of records of the log in at least one embodiment, the logger prevents write records, that occur in the log after a second record taking a snapshot, from being flushed prior to flushing the second record taking/creating the snapshot.

After recording 302a in the log, the storage system can receive writes W1 and W2 that are respectively recorded as entries 302b-c in the log. W1 and W2 can be writes directed respectively to LBAs A and B of V1 In at least one embodiment, the write records 302b-c would normally induce write splits in the mapper 260 if the record 302a taking snap1 were allowed to be flushed before the records W1 and W2. In at least one embodiment, this can be avoided by delaying flushing of record 302a based on the transient flag TF.

Subsequent to recording the entries 302b-c in the log, RRF can issue a command or request to take a second transient or replication related snapshot, snap2, of the source volume V1. The request to take snap2 of V1 is recorded in the log as record 302d, where snap2 can have the transient flag (TF) set to signal to delay flushing the record 302d.

After recording 302d in the log, the storage system can receive writes W3 and W4 that are respectively recorded as entries 302e-f in the log. W3 and W4 can be writes directed respectively to LBAs C and D of V1 In at least one embodiment, the write records 302e-f would normally induce write splits in the mapper 260 if the record 302d taking snap2 were allowed to be flushed before the records W3 and W4. In at least one embodiment, this can be avoided by delaying flushing of record 302d based on the transient flag TF.

After recording entries 302e-f in the log, the RRF can issue a command or request to delete the transient or replication related snapshot, snap1 of V1. Snap1 of V1 is the snapshot instance taken by the recorded command of the record 302a. The command to delete snap1 of V1 can be recorded in entry 302g of the log. At some later point in time, the logger can associate delete snap1 record 302g with the create snap1 record 302a, and invalidate the create snap1 record 302a. As such, the logger can be viewed as cancelling the creation or taking of snap1 of V1 such that mapper does not perform any processing related to creating or deleting the snap1 of V1. The result of such invalidation by logger is to allow the write records W1 302b and W2 302c without inducing write splits in the mapper 260. Rather, the writes W1 302b and W2 302c can be flushed and proceed as ordinary writes.

After recording the record 302g in the log, the RRF can issue a command or request to take a third transient or replication related snapshot, snap3, of the source volume V1. The request to take snap3 of V1 is recorded in the log as record 302h, where the transient flag (TF) is set for snap3 to signal to delay flushing the record 302h.

After recording 302h in the log, the storage system can receive write W5 recorded as entry 302i in the log. W5 can write to LBA E of V1. In at least one embodiment, the write record 302i would normally induce write splits in the mapper 260 if the record 302h taking snap3 were allowed to be flushed before the record W5 302i. In at least one embodiment, this can be avoided by delaying flushing of record 302h based on the transient flag TF.

After recording 302i in the log, the RRF can issue a command or request to delete the transient or replication related snapshot, snap2 of V1. Snap2 of V1 is the snapshot instance taken by the recorded command of the record 302d. The command to delete snap2 of V1 can be recorded in entry 302j of the log. At some later point in time, the logger can associate delete snap2 record 302j with the create snap2 record 302d, and invalidate the create snap2 record 302d. The result of such invalidation by logger would be to allow the write records W3 302e and W4 302f without inducing write splits in the mapper 260. Rather, the writes W3 302e and W4 302f can be flushed and proceed as ordinary writes.

As can be seen from FIG. 6, sequences including creating and deleting multiple transient snapshots can be managed by invalidation by logger and delaying flushing of transient snapshots marked using the TF flag, which can avoid: creating any mappings (e.g., of metadata pages) for the snapshots, deleting the mappings for the snapshots, performing write splits when there is block sharing with the snapshots, and performing any needed cleanup after the write splits (e.g., deleting unneeded metadata supporting the write splits).

It should be noted that the example of FIG. 6 depicts an ordering in which the deletion of snap1 (302g) is placed before the creating of snap 3 (302h) thereby leaving snap2 as the only existing snapshot. In this example, the order or placement of delete snapshot commands and create snapshots commands is controlled by the RRF. In some embodiments, the RRF can have at least two transient snapshots at any given time. In this case, RRF can alternatively ensure a corresponding command sequence, for example, such that creating snap3 would alternatively occur prior to deleting snap1. In such an embodiment, there can be one replication cycle between two successive transient snapshots for which content is being replicated, and there can be another replication cycle that is open for which writes or data change are being tracked or collected.

Figure 7:
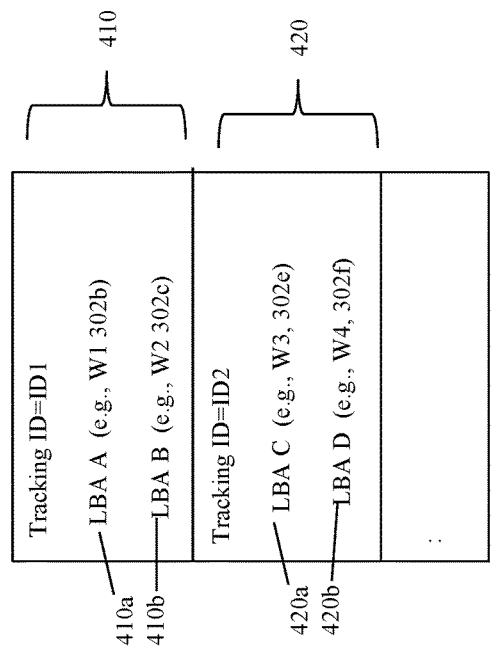
FIG. 7 is an example illustrating use of write tracking in at least one embodiment in accordance with the techniques of the present disclosure.

Referring to FIG. 7, shown is an example 400 of information that can be obtained as a result of write tracking in at least one embodiment in accordance with the techniques of the present disclosure.

In at least one embodiment, the cache or caching layer can perform write tracking of tagged writes where the cache can identify all writes tagged with a particular tracking identifier (ID). The particular tracking ID can uniquely identify a particular replication cycle between two successive snapshots of a source volume, and all writes tracked with the particular tracking ID can denote the data changes in the replication cycle. Put another way, writes can be tracked in a particular tracking session denoted by the tracking ID where the tracking session tracks writes made between two successive transient snapshots N−1 and N. Additionally generally the writes tracked for the tracking session with the tracking ID denote the writes included in the snapshot N.

The information of 400 can be stored in the cache, such as a volatile memory cache. The information of 400 can include a list of changes to the source volume V1 between successive transient or replication related snapshots taken by RRF. In at least one embodiment, each tracking ID can uniquely identify a corresponding replication cycle between two successive transient snaps. The example 400 includes tracked writes for 2 replication cycles, where each replication cycle can denote data changes or writes made to V1 between two successive transient snapshots N−1 and N, and where such writes or data changes are included in the snapshot N.

FIG. 6 illustrates a sequence of commands or operations recorded in the log including 3 commands or requests to take snapshots of V1. With reference back to FIG. 6, let a tracking ID=ID1 denote the data changes or writes included in a first replication cycle or tracking session between snap1 of V1 and snap2 of V1; and let a tracking ID=ID2 denote the data changes or writes included in a second replication cycle or tracking session between snap2 of V1 and snap3 of V1. Based on the foregoing in this example, writes or data changes tracked with tracking ID=ID1 can be those writes made to V1 during the time interval between taking snap1 of V1 and snap 2 of V1. Additionally, writes or data changes tracked with tracking ID=ID2 can be those writes made to V1 during the time interval between taking snap2 of V1 and snap 3 of V1.

The example 400 includes element 410 denoting tracked writes tagged with tracking ID=ID1 identifying those writes or data changes made to V1 in the first replication cycle or tracking session between snap1 and snap2 of V1. The element 410 includes: LBA A 410a corresponding to the write W1 302b, and LBA B 410b corresponding to the write W2 302c, where such writes W1 and W2 occur between taking snap 1 (302a) and snap2 (302d), and where such writes W1 and W2 can be tagged with the tracking ID=ID1.

The example 400 includes element 420 denoting tracked writes tagged with tracking ID=ID2 identifying those writes or data changes made to V1 in the second replication cycle or tracking session between snap2 and snap3 of V1. The element 420 includes: LBA C 420a corresponding to the write W3 302e; and LBA D 410b corresponding to the write W4 302f, where such writes W3 and W4 occur between taking snap2 (302d) and snap 3 (302h), where such writes W3 and W4 can be tagged with the tracking ID=ID2.

For a replication cycle or tracking session having a corresponding tracking ID, RRF can determine the list of locations of data changes or writes having associated content to be replicated in the replication cycle or tracking session by querying the cache for all tracked writes having the corresponding tracking ID. For example, RRF can perform processing to determine the list or set of locations of data changes in the first replication session by querying the cache for all tracked writes having the tracking ID of ID1. In response, the cache can return to RRF a list of LBAs or offsets, and associated lengths, of tracked writes of V1 having the tracking ID of ID1. In this example, the cache can determine that the LBA A 410a and LBA B 410b of V1 have been written to or modified during the first replication cycle or tracking session between snap1 and snap2.

Thus the RRF can determine a first set of data changes to be replicated from the source system to the target system by querying the cache for locations of V1 of tracked writes having the tracking ID=ID1, and then obtaining the data written to such locations, such as LBA A and LBA B of V1, during the corresponding replication cycle. In response to the query for tracked writes associated with tracking ID=ID1, the cache can return to RRF a list of LBA A and LBA B. In at least one embodiment, the content or data written by W1 to LBA A and by W2 to LBA B during the corresponding replication cycle can be retained in the cache until replicated. Thus, RRF can read, from the cache, the write data of LBA A (W1) and LBA B (W2) to be replicated. Once the write data of LBA A and LBA B has been replicated, write data of LBA A and LBA B, as stored in the cache, can be candidates for eviction or removal from the cache. The first set of data changes or differences denotes the locations of V1 that have been modified or written during the corresponding replication cycle between snaps 1 and 2 of V1.

RRF can perform processing to determine the list or set of locations of data changes in the second replication session by querying the cache for all tracked writes having the tracking ID of ID2. In response, the cache can return to RRF a list of LBAs or offsets, and associated lengths, of tracked writes of V1 having the tracking ID of ID2. In this example, the cache can determine that the LBA C 420a and LBA D 420b of V1 have been written to or modified during the second replication cycle or tracking session between snap2 and snap3 of V1.

Thus the RRF can determine a second set of data changes to be replicated from the source system to the target system by querying the cache for locations of V1 of tracked writes having the tracking ID=ID2, and then obtaining the data written to such locations, such as LBA C and LBA D of V1 during the corresponding replication cycle. In response to the query for tracked writes associated with tracking ID=ID2, the cache can return to RRF a list of LBA C and LBA D of V1. In at least one embodiment, the content or data written by W3 to LBA C and by W4 to LBA D during the corresponding replication cycle can be retained in the cache until replicated. Thus, RRF can read, from the cache, the write data of LBA C (W3) and LBA D (W4) of V1 to be replicated. Once the write data of LBA C and LBA D of V1 has been replicated, write data of LBA C and LBA D, as stored in the cache, can be candidates for eviction or removal from the cache. The second set of data changes or differences denotes the locations of V1 that have been modified or written to during the corresponding second replication cycle between snaps 2 and 3 of V1.

Thus in at least one embodiment, low RPO replication processing can include efficiently determining the set or list of changed locations of V1 for a particular replication cycle by querying the cache for the list. Additionally, low RPO replication processing can include efficiently obtaining the content of such changed locations by then reading the content of such changed locations from cache where such content can be retained and can remain in the cache until replicated.

Thus generally in at least one embodiment, asynchronous replication as performed using the low RPO replication techniques described herein can utilize multiple optimization to achieve very low RPOs, such as RPOs that are less than 30 seconds. Such multiple optimizations in at least one embodiment are described elsewhere herein and can include: write tracking; retaining records of the transient snapshots are recorded in the log until deleted; and retaining data to be replicated in cache until replicated.

Figure 8A:
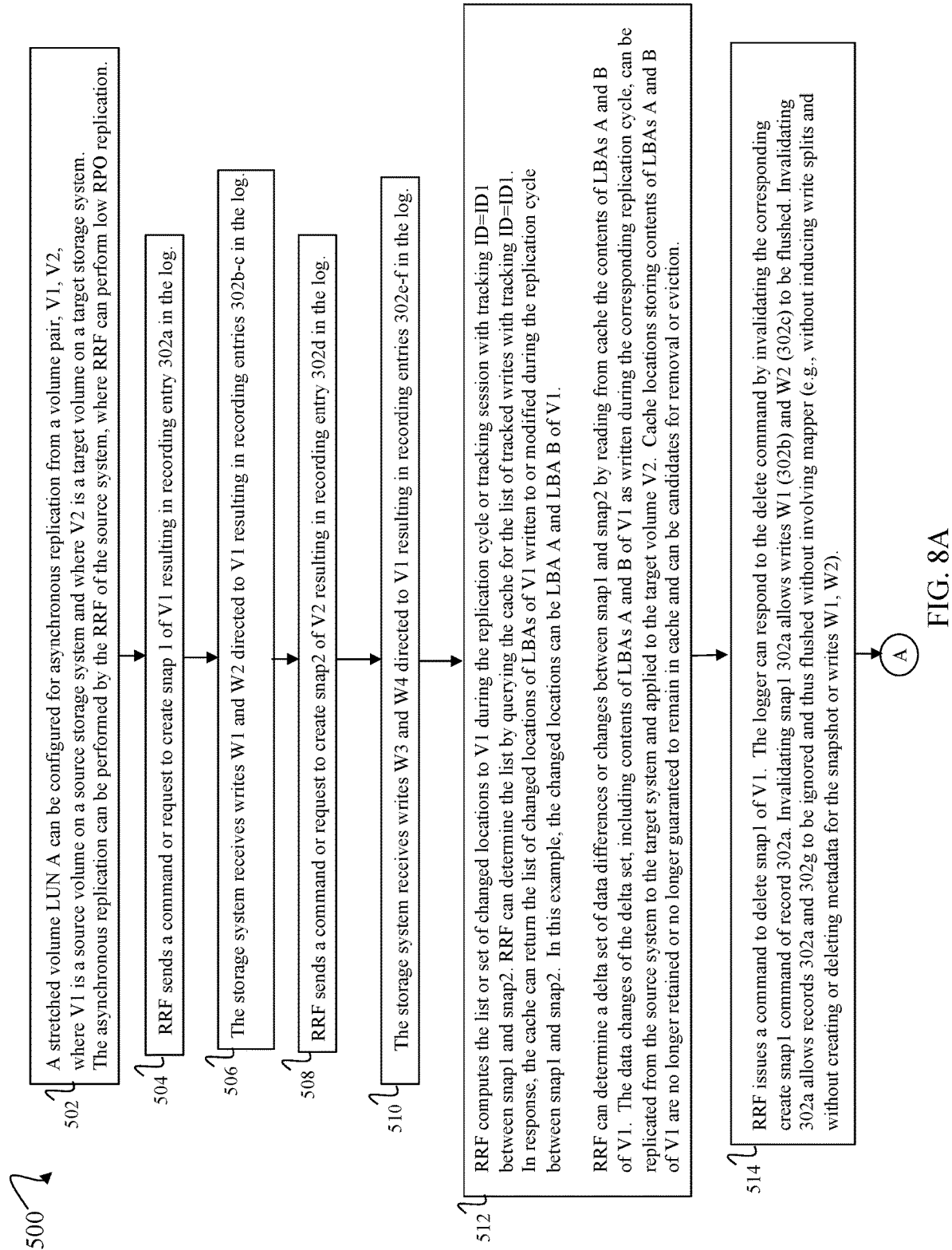
FIGS. 8A-8B and 10 are processing steps flowcharts that can be performed in at least one embodiment in accordance with the techniques of the present disclosure.
Figure 8B:
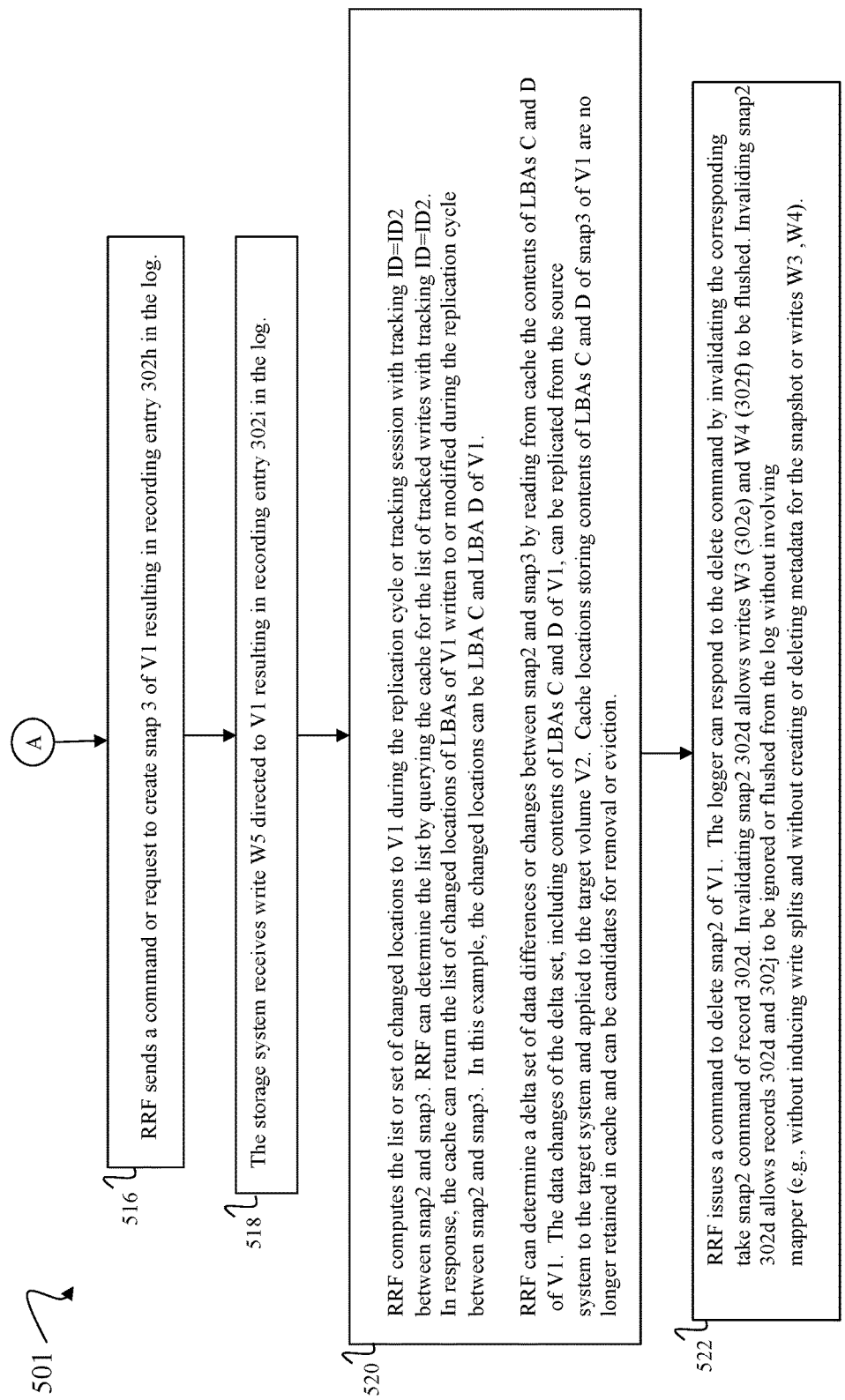

Referring to FIGS. 8A and 8B, shown is a flowchart 500, 501 of processing steps that can be performed in at least one embodiment in accordance with the techniques of the present disclosure. The steps of FIGS. 8A and 8B describe a sequence of processing steps that can be performed based on the example of FIGS. 6 and 7.

In the step 502, a stretched volume LUN A can be configured for asynchronous replication from a volume pair, V1, V2, where V1 is a source volume on a source storage system and where V2 is a target volume on a target storage system. The asynchronous replication can be performed by the RRF of the source system, where RRF can perform low RPO replication. From the step 502, control proceeds to the step 504.

At the step 504, RRF sends a command or request to create snap 1 of V1 resulting in recording entry 302a in the log. From the step 504, control proceeds to the step 506.

At the step 506, the storage system receives writes W1 and W2 directed to V1 resulting in recording entries 302b-c in the log. From the step 506, control proceeds to the step 508.

At the step 508, RRF sends a command or request to create snap2 of V2 resulting in recording entry 302d in the log. From the step 508, control proceeds to the step 510.

At the step 510, the storage system receives writes W3 and W4 directed to V1 resulting in recording entries 302e-f in the log. From the step 510, control proceeds to the step 512.

At the step 512, RRF computes the list or set of changed locations to V1 during the replication cycle or tracking session with tracking ID=ID1 thereby denoting the replication cycle between snap1 of V1 and snap2 of V1. RRF can determine the list by querying the cache for the list of tracked writes with tracking ID=ID1. In response, the cache can return the list of changed locations or LBAs of V1 written to or modified during the replication cycle between snap1 and snap2 where such tracked writes are tagged with tracking ID=ID1. In this example, the changed locations can be LBA A and LBA B of V1. RRF can determine a delta set of data differences or changes between snap1 and snap2 by reading from cache the contents of LBAs A and B of V1 as written during the corresponding replication cycle. The data changes of the delta set, including contents of LBAs A and B of V1 as written during the corresponding replication cycle, can be replicated from the source system to the target system and applied to the target volume V2. At this point, cache locations storing contents of LBAs A and B of V1 are no longer retained in cache and can be candidates for removal or eviction. From the step 512, control proceeds to 514.

At the step 514, RRF issues a command to delete snap1 of V1. The logger can respond to the delete command by invalidating and thus canceling the corresponding create snap1 command of record 302a. Invalidating snap1 302a allows writes W1 (302b) and W2 (302c) to be flushed.

Invalidating snap1 302a allows the create snap1 record 302a and delete snap1 record 302g to be canceled so that flushing can simply ignore records 302a and 302g without involving mapper (e.g., without inducing write splits, and without creating or deleting metadata for the snapshot or writes W1, W2). From the step 514, control proceeds to the step 516.

At the step 516, RRF sends a command or request to create snap 3 of V1 resulting in recording entry 302h in the log. From the step 516, control proceeds to the step 518.

At the step 518, the storage system receives write W5 directed to V1 resulting in recording entry 302i in the log. From the step 518, control proceeds to the step 520.

At the step 520, RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3, where such locations are associated with tracked writes having tracking ID=ID2. In this example, the changed locations can be LBA C and LBA D of V1. RRF can determine a delta set of data differences or changes between snap2 and snap3 by reading from cache the contents of LBAs C and D of V1 as written during the corresponding replication cycle. The data changes of the delta set, including contents of LBAs C and D of V1, can be replicated from the source system to the target system and applied to the target volume V2. At this point, cache locations storing contents of LBAs C and D of V1 are no longer retained in cache (e.g., are not guaranteed to remain in cache) and can be candidates for cache removal or eviction. From the step 520, control proceeds to the step 522.

At the step 522, RRF issues a command to delete snap2 of V1. The logger can respond to the delete command by invalidating and thus canceling the corresponding take snap2 command of record 302d. Invalidating snap2 302d allows writes W3 (302e) and W4 (302f) to be flushed. Invalidating snap2 302d allows the records 302d and 302j to be canceled so that flushing can simply ignore records 302d and 302j without involving mapper (e.g., without inducing write splits, and without creating or deleting metadata for the snapshot or writes W3,W4).

The foregoing describes various optimizations that can be performed in connection with low RPO replication techniques for asynchronous replication in at least one embodiment. As can be observed from the foregoing discussions, the low RPO replication techniques use cache resources and log resources. In at least one embodiment, the cache resources can be volatile memory cache resources and the log resources can be non-volatile or persistent storage used for the persisted log. As the I/O load on the volumes under asynchronous replication using the low RPO techniques increases and/or as the number of volumes under asynchronous replication using the low RPO techniques increases, the available or free cache and log resource can run low such as below corresponding minimum thresholds. Due to the low levels of free cache and log resources, asynchronous replication using the low RPO techniques can fail to sustain very low RPO targets (e.g., such as 30 seconds or less) for several volumes in a short period of time causing at least some of the volumes to fall out of compliance by not meeting corresponding low RPO targets.

In accordance with the techniques of the present disclosure, multiple service levels of low RPO replication can be defined where each such service level can enable or disable performing one or more particular optimizations of the low RPO replication technique. Thus each of the multiple service levels can be expected to consume varying amounts of log and cache resources. Lower service levels can perform fewer or no low RPO replication optimizations, where the lower the service level, the fewer the low RPO replication optimizations performed and thus the less cache and log resources consumed.

In at least one embodiment, processing can be performed to monitor resource consumption of cache and log resources. When the amount of free cache and/or the amount of free log space falls below a corresponding minimum, processing can be performed in accordance with the techniques of the present disclosure to proactively transition low RPO replication sessions for one or more volumes from a higher service level to a lower service level in efforts to maintain low/very low RPO targets for the maximum number of volumes. In at least one embodiment, the lower service level selected and the particular volumes selected can be based, at least in part, on the particular resource(s), such as cache resources and/or log resources, experiencing the current free level below a corresponding minimum. When resource pressure lowers and the amount of free resource(s) once again increases such as above a specified threshold that can be greater than the corresponding minimum, the system can accordingly transition more volumes from a lower service level to a higher service level. In at least one embodiment, the higher service level selected and the particular volumes selected can be based, at least in part, on the particular resource(s), such as cache resources and/or log resources, experiencing the increase in available or free amount.

In the following discussion, data can generally be stored in cache. In some contexts in at least one embodiment, a portion of the cache or cache resources used to store user data or content (e.g., user data cache or data cache) can be further partitioned (e.g., logically or otherwise) into a read cache and a write cache. The read cache can refer to a portion of the cache or cache resources used to store clean data such as write data that has been flushed from the log and stored on BE non-volatile storage. The write cache can refer to a portion of the cache or cache resources used to store dirty write data, such as write data of a recorded write I/O that has not yet been flushed from the log and stored on BE non-volatile storage. Generally dirty data stored at a logical address can refer to cached data that has not been flushed from the log, and thus the log, rather than BE non-volatile storage, includes the most recent content stored at the logical address.

In at least one embodiment, data or content stored in the cache can be organized and maintained using any suitable cache management technique. In at least one embodiment, write data written by a write I/O that is recorded in an unflushed log record can be marked and characterized as dirty, where the dirty write data can remain in the cache until the corresponding write I/O log record has been flushed from the log. Once the corresponding write I/O log record has been flushed, the write data of the write I/O can be persistently stored on BE non-volatile storage and the write data can be marked and characterized as clean, where the clean write data is a candidate allowed to be evicted or removed from the cache. In at least one embodiment, various policies, such as least recently used (LRU), can be used in connection with management of cache storage such as select cached content for eviction or removal from the cache if a new cache location is needed.

Referring to FIG. 9, shown is an example 800 of low RPO replication service levels that can be defined in at least one embodiment in accordance with the techniques of the present disclosure.

In at least one embodiment, each stretched volume or storage object configured for asynchronous replication using low RPO replication techniques can be further configured to operate in one of the defined service levels denoting different levels of optimization performed in connection with low RPO replication.

In at least one embodiment, 4 service levels can be defined: high, medium, low and off. The example 800 includes a table with a first column, service level 802, and a second column, optimizations performed 804. Each line of the table 800 denotes particular low RPO replication optimizations performed for a corresponding service level. Put another way, each line of the table 800 denotes particular low RPO replication optimizations that are enabled (performed) or disabled (not performed) for a corresponding service level.

Generally, the service levels denoting decreasing levels of low RPO optimizations, from highest optimization level to lowest optimization level, can be ranked as follows: high (e.g., the highest optimization level) medium, low and off (the lowest optimization level with no low RPO optimization performed).

Line 810 denotes optimizations performed for the high service level. Generally in the high service level, all RPO replication optimizations are enabled and performed. In the high service level, write tracking is performed to track writes and store the list of tracked writes in cache. Additionally in the high service level, transient snapshots and dirty write data to be replicated can be held in the log without flushing. In the high service level, all data to be replicated can be held in the cache until replicated. The transient snapshots can be held in the log until deleted by RRF. In at least one embodiment as discussed above for a replication cycle between transient snapshots N−1 and N, RRF can delete a transient snapshot N−1 once writes of the cycle occurring between the two transients snapshots N−1 and N have been replicated. Generally, the high service level setting for an asynchronous replication session of a stretched volume results in performing all the low RPO replication optimizations such as discussed above in connection with FIGS. 6, 7, 8A and 8B.

Line 812 denotes optimizations performed in the medium service level. In the medium service level: write tracking is performed to track writes and store the list of tracked writes in cache; transient snapshots can be flushed from the log to mapper and are not retained in the log until deleted by the RRF; and all data (dirty and clean) to be replicated is held in cache until replicated. In the medium service level, transient snapshots even though marked with the TF indicator can be flushed from the log as log records to create such transient snapshots are encountered by logger in connection with log flushing.

It should be noted that retaining a log entry for a command that creates a transient snapshot of V1 results in also retaining log entries for subsequent writes to V1. Thus retaining the transient snapshot and the corresponding subsequent writes in the log results in consuming corresponding log resources for an extended period of time until the transient snapshot is deleted by RRF. In at least one embodiment, log entries can be stored both persistently and in volatile cache memory. Accordingly retaining log entries for the transient snapshot of V1 and subsequent writes to V1 thus can also result in consuming additional cache. Alternatively, flushing the log entries for the transient snapshot of V1 thereby allows the subsequent writes to also be flushed from the log, where both log resources and cache resources consumed for storing the log entries and subsequent writes can now be freed and available for other uses.

Line 814 denotes optimizations performed in the low service level. In the low service level: write tracking is performed to track writes and store the list of tracked writes in cache; transient snapshots can be flushed from the log to mapper and are not retained in the log until deleted by the RRF; at least some of the data to replicated is not in cache and results in a read cache miss where the data is then read from BE non-volatile storage; and dirty data that get flushed from the log and is to be replicated is not retained in the cache and can be a candidate for removal or eviction from the cache. Generally in the low service level, data to be replicated is not retained or guaranteed to be in cache such that if data to be replicated is stored in cache, it can be removed or evicted from the cache prior to replicating the data.

Line 816 denotes optimizations performed in the off service level. No optimization of the low RPO replication is performed (e.g., low RPO replication processing can be disabled while in the off service level). An alternative asynchronous replication technique can be performed. In at least one embodiment, the legacy snapshot difference technique can be performed when in off mode or service level. With the legacy snapshot difference technique, the snapshot difference can always be determined between successive two snapshots that have been created and thus flushed from the log to mapper. In this manner, metadata has been created by mapper for the two snapshots and any writes applied to the source volume can result in performing write split processing as noted elsewhere herein that includes allocating/creating one or more new metadata pages for use with the snapshots as writes are applied to the source volume. The legacy snapshot difference technique can include determining the data differences between the two successive snapshots by traversing the metadata pages corresponding to each snapshot. Thus the legacy snapshot difference technique is generally more time consuming than determining the difference between two successive snapshots using the tracked writes in the low RPO technique. In at least one embodiment, the legacy snapshot technique or alternative technique performed when in the off service level can be expected to consume less cache resources and/or log resources than the low RPO technique.

In at least one embodiment, a background process can monitor resource consumption of the cache and log resources to determine corresponding current amounts of free cache and free log space in the persistent log. In response to a first amount of free cache falling below a first minimum and/or a second amount of free persistent log space falling below a second minimum, the techniques of the present disclosure can be further provide for proactively moving or setting selected one or more source volumes of configured stretched volumes to a lower service level prior to having many configured stretched volumes fall out of RPO compliance. Moving some stretched volume configurations to a lower service level can result in freeing up additional cache and/or log resources and allow more volumes to remain compliant with their respective low RPO targets. As the amounts of free cache and free log space increase, volumes can be moved from the lower service level to a higher service level allowing for a more optimized level of asynchronous replication.

In at least one embodiment, a first portion of cache or cache resources denoting a write cache can be used for storing dirty write data that has not yet been flushed from the log, and a second portion of cache or cache resources denoting a read cache can be used for storing clean data that has been flushed from the log. Thus in at least one embodiment, resource monitoring can include monitoring an amount of free cache, and can further include: i) monitoring an amount of free write cache or free write cache resources, and ii) monitoring an amount of free read cache or free read cache resources. Additionally, a third portion of cache or volatile memory can be used for tracking writes (e.g., used to store locations or offsets of volumes that are modified in particular replication cycle), where monitoring can include monitoring the amount of free write tracking cache or memory space used for storing tracked writes.

In at least one embodiment, if an amount of free persistent log space falls below a corresponding threshold and/or an amount of free write cache falls below a corresponding threshold, a first set of one or more stretched volumes under low RPO replication that are currently in the high service level can be moved to the medium service level. The transient snapshots of the selected stretched volumes of the first set can be flushed to increase free log space and increase free write cache. Note that flushing the transient snapshots for the selected volumes may also result in flushing some of the subsequent recorded write I/Os (e.g., dirty data) for the volumes from the log. The write data of the flushed recorded write I/Os may need to be replicated. In at least one embodiment when operating in the high or medium service level, such write data of the flushed recorded write I/Os can remain in the read cache until such write data is replicated.

In at least one embodiment, the source volumes of the stretched volumes can be ranked in terms of persistent log space consumed, from highest to lowest. If the amount of free log space is below a threshold, the first set can include one or more of the highest rank stretched volumes in terms of consuming the most free log space of all volumes.

In at least one embodiment, the source volumes of the stretched volumes can be ranked in terms of write cache consumed, from highest to lowest. If the amount of free write cache is below a threshold, the first set can include one or more of the highest rank stretched volumes in terms of consuming the most write cache of all volumes.

In at least one embodiment, once the amount of free persistent log space and the amount of free write cache space increase to desired corresponding levels, one or more of the stretched volumes of the first set can be transitioned back from the medium service level to the high service level.

In at least one embodiment, if an amount of free read cache falls below a corresponding threshold, a second set of one or more stretched volumes under low RPO replication that are currently in the high service level or medium service level can be selected to move to the low service level. In at least one embodiment, the selected stretched volumes of the second set can have a high page count in the read cache. In at least one embodiment, source volumes of the stretched volumes can be ranked in terms of the amount of cache pages or amount of read cache pages consumed, from highest to lowest. The one or more stretched volumes selected for the second set can have corresponding source volumes that are the highest ranked in terms of the amount of read cache pages consumed (e.g., the source volumes consuming the most read cache space can be included in the second set). Dirty data of volumes in the medium service level that gets flushed from the log is not retained in the read cache and can be a candidate for removal or eviction.

In at least one embodiment, once the amount of free read cache space increases to a desired corresponding level, one or more of the stretched volumes of the second set can be transitioned from the low service level to a relatively higher service level (e.g., medium or the high service level).

In at least one embodiment, if the amount of free memory or cache of the write tracking cache falls below a corresponding threshold, processing can be performed to select a third set of one or more stretched volumes that are in any of the high, medium and low service levels and that have high write tracking memory or cache usage. Such selected stretched volumes of the third set can move to the off service level to free up write tracking memory or cache and allow other remaining volumes to continue to maintain compliance. In at least one embodiment, stretched volumes in the high, medium and low service levels can be ranked in terms of write tracking memory or cache consumption, from highest to lowest. The one or more stretched volumes selected can be the highest ranked in terms of the amount of write tracking memory or cache consumed for storing tracked writes of the respective volume.

In at least one embodiment, once the amount of free memory or cache of the write tracking cache space increases to a desired corresponding level, one or more of the stretched volumes of the third set can be transitioned from the off service level to a higher service level (e.g., any of low, medium or high service levels).

In at least one embodiment, selecting one or more stretched volumes having their service level lowered can also be based, at least in part, on user specified priority for stretched volumes. For example, a user can specify that a fourth set of one or more particular stretched volumes have priority over others where a volume in the fourth set may not be selected to have its current service level downgraded to a lower service level. For example, a user can specify that a fifth set of one or more particular stretched volumes have priority over others where a volume in the fifth set may be selected to have its current service level upgraded to a higher service level before other volumes not included in the fifth set.

In at least one embodiment, selecting one or more stretched volumes having their service level lowered and/or increased can be based, at least on part, on any one or more of: the I/O workload directed to the volume, the replication rate for the volume, cache utilization by the volume, and/or log space utilization by the volume.

It should be noted that although the monitoring described above and elsewhere herein can monitor the amount of free log and cache resources available for use with the low RPO replication techniques, an embodiment can alternatively monitor the levels of consumed log and cache resources. In this case, processing to move selected stretched volumes from a higher to a lower service level can be performed responsive to a level of resource consumption (e.g., amount of a consume resource) exceeding a maximum threshold. Additionally in such an embodiment, processing to move selected stretched volumes from a lower service level to a higher service level can be performed responsive to a level of resource consumption falling below another threshold that can be below the foregoing maximum threshold.

Without using the techniques of the present disclosure to dynamically modify and decrease service levels of one or more stretched volumes as described above, increased resource consumption or pressure from I/O workloads of low RPO replication can result in multiple stretched volume configurations falling out of target RPO compliance within a short amount of time.

The techniques of the present disclosure provide for a more efficient distribution of resources used in connection with low RPO replication techniques described herein. Use of the techniques of the present disclosure can allow configured stretched volumes actively performing low RPO replication at various service levels to continue through bursts or periods of high I/O workload without stretched volumes falling out of target RPO compliance (e.g., where the volumes can still meet specified low target RPOs).

Figure 10:
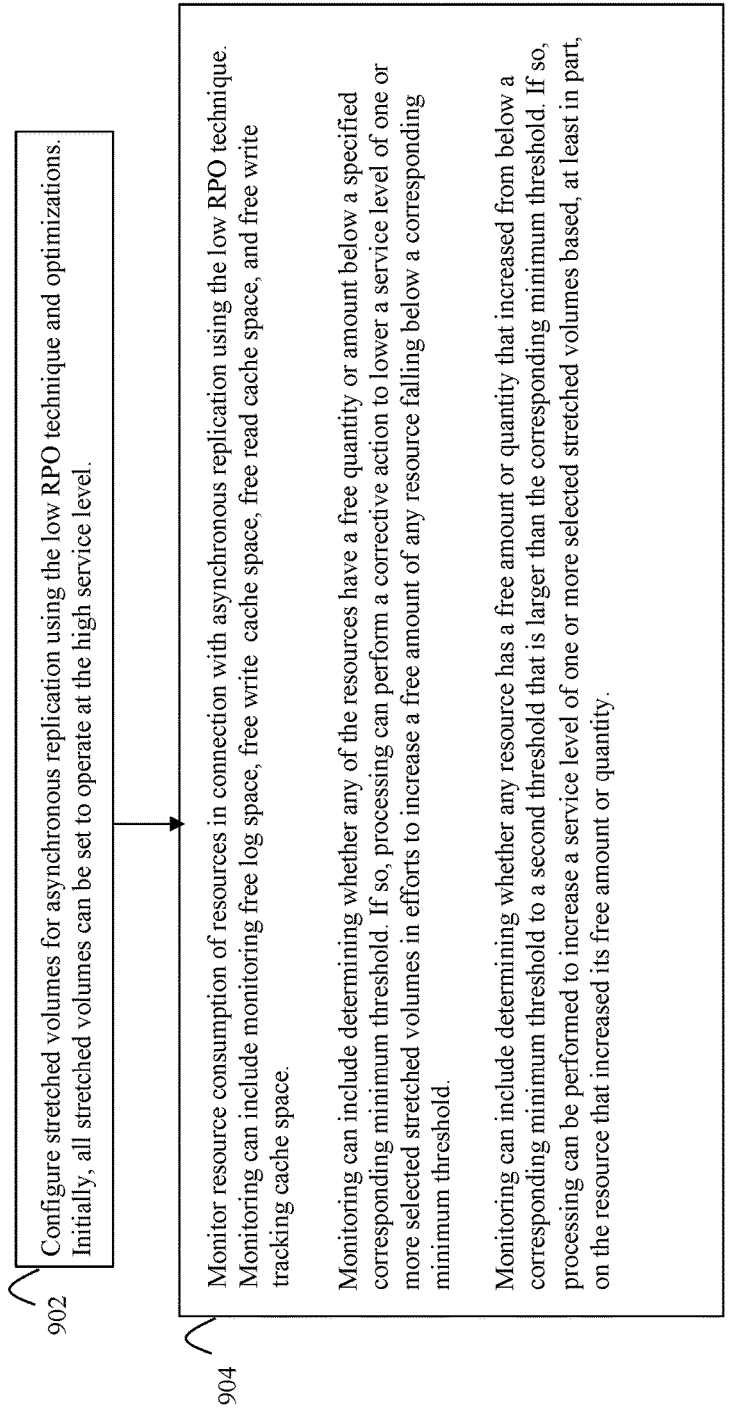

Referring to FIG. 10, shown is a flowchart 900 of processing that can be performed in at least one embodiment in accordance with the techniques of the present disclosure. FIG. 9 summarizes processing discussed above.

At the step 902, processing can be performed to configure stretched volumes for asynchronous replication using the low RPO technique and optimizations. Initially in at least one embodiment, all stretched volumes can be set to operate at the high service level. More generally, a stretched volume can be initially configured to operate at any one of the defined service levels. From the step 902, control proceeds to the step 904.

At the step 904, processing is performed to monitor resource consumption of resources in connection with asynchronous replication using the low RPO technique. In at least one embodiment, monitoring can include monitoring free log space and free cache space. In at least one embodiment, monitoring can include monitoring free log space, free read cache space, free write cache space, and free write tracking cache space.

Monitoring of the step 904 can include determining whether any of the resources have a free quantity or amount below a specified corresponding minimum threshold. The step 904 can include determining whether the current amount of free log space of the persistent log is below a first minimum. The step 904 can include determining whether the current amount of free read cache space is below a second minimum. The step 904 can include determining whether the current amount of free write cache space is below a third minimum. The step 904 can include determining whether the current amount of free write tracking cache space is below a fourth minimum. In at least one embodiment, if any one or more of the foregoing current free amounts of a corresponding resource is below a corresponding minimum, processing can perform a corrective action to lower a service level of one or more selected stretched volumes in efforts to increase a free amount of any resource falling below a corresponding minimum threshold. Thus if the current amount of free log space of the persistent log is below the first minimum, a corrective action can be performed such as selecting one or more stretched volumes, operating at the high service level and consuming a large amount of log space, to move to the medium service level. If the current amount of free read cache space is below the second minimum, a corrective action can be performed such as selecting one or more stretched volumes, that operate at the high or medium service level and consume a large amount of read cache space, to move to the low service level. If the current amount of free write cache space is below the third minimum, a corrective action can be performed such as selecting one or more stretched volumes, that operate at the high service level and consume a large amount of write cache space, to move to the medium service level. If the current amount of free write tracking cache space is below the fourth minimum, a corrective action can be performed such as selecting one or more stretched volumes, that operate at the high, medium or low service level and consume a large amount of write tracking cache space, to move to the off service level.

In at least one embodiment, the step 904 can include determining whether a current amount of free cache resources is below a specified minimum. If so, processing can be performed to select one or more stretched volumes to have their current service level lowered to a lower service level. In at least one embodiment, the number of stretched volumes selected and/or the particular stretched volumes selected can be based, at least in part, on the amount of cache consumed in connection with low RPO replication for each corresponding volume. In at least one embodiment, changing from operating at the higher service level to the lower service level can be expected to reduce the amount of cache resources consumed in connection with low RPO replication for the particular selected stretched volumes. In at least one embodiment, when the current amount of free cache resources is below a specified minimum, at least some of the volumes selected can have a current service level that is high which is lowered to the medium or low service level. In at least one embodiment, when the current amount of free cache resources is below a specified minimum, at least sone of the volumes selected can have a current service level that is medium which is lowered to the low service level.

Monitoring of the step 904 can also include determining whether any resource has a current free amount or quantity that increased from below a corresponding minimum threshold to above a second threshold, where the second threshold can be larger than the corresponding minimum threshold. If so, processing can be performed to increase a service level of one or more selected stretched volumes based, at least in part, on the resource that experienced the increased free amount or quantity to the second threshold. The foregoing can be performed, for example, to detect a resource for which a corrective action was previously performed to increase the free amount or quantity of the resource by lowering a service level of one or more stretched volumes. If the prior corrective action is successful and has sufficiently raised the free or available amount of the resource above the second threshold, then processing can now be performed to accordingly increase the service level of one or more stretched volumes, such as raise the service level of stretched volumes previously reduced in the corrective action.

For example, at a first prior point in time, there may have been multiple stretched volumes consuming a large amount of log space and/or write cache, where each such volume had their service level reduced from high to medium in efforts to increase the amount of free log space and/or free write cache. Now at a second point in time subsequent to the first point in time, the amount of free log space may have increased to above a specified threshold that is generally greater than the first minimum. Responsive to the increase in free log space to the specified threshold, one or more volumes operating at the medium service level can be increased to operate at the high service level.

As another example, at the first prior point in time, there may have been multiple stretched volumes consuming a large amount of read cache, where each such volume had their service level reduced from high or medium to low in efforts to increase the amount of free read cache. Now at the second point in time subsequent to the first point in time, the amount of free read cache may have increased to above a specified threshold that is generally greater than the second minimum. Responsive to the increase in the amount of free read cache space to the specified threshold, one or more volumes operating at the low service level can be increased to operate at the medium or high service level.

As yet another example, at the first prior point in time, there may have been multiple stretched volumes consuming a large amount of write tracking cache, where each such volume had their service level reduced to off in efforts to increase the amount of free write tracking cache space. Now at the second point in time subsequent to the first point in time, the amount of free write tracking cache space may have increased to above a specified threshold that is generally greater than the fourth minimum. Responsive to the increase in the amount of free write tracking cache space to the specified threshold, one or more volumes operating at the off service level can be increased to operate generally at any higher service level (e.g., any of low, medium or high service levels).

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume;
   specifying a plurality of current replication settings for the plurality of stretched volumes, wherein each of the plurality of replication settings denotes one of a plurality of replication service levels selected for a corresponding one of the plurality of stretched volumes, wherein each of the plurality of replication service levels denotes a different level of optimization performed for asynchronous replication;
   performing asynchronous replication for the plurality of stretched volumes in accordance with the plurality of replication current replication settings;
   monitoring resource consumption of one or more resources consumed during asynchronous replication processing, wherein said monitoring includes:
      monitoring a first amount of a first resource of the one or more resources, wherein the first amount denotes a current amount of the first resource that is free and available for use; and
   responsive to determining that the first amount of the first resource is below a first minimum threshold, performing a corrective action to increase the current amount of the first resource that is free, wherein the plurality of replication service levels includes a first replication service level and a second replication service level, and wherein the corrective action includes:
      changing a first current replication setting of the plurality of current replication settings for a first stretched volume of the plurality of stretched volumes from the first replication service level to the second replication service level, wherein the second replication service level is expected to consume less of the first resource than the first replication service level when performing asynchronous replication for the first stretched volume.

2. The computer-implemented method of claim 1, wherein the plurality of replication service levels includes a high service level, a medium service level, a low service level, and an off service level, and wherein the first replication service level is the high service level and the second service level is any of: the medium service level, the low service level, and the off service level.

3. The computer-implemented method of claim 2, wherein the first resource is any of: i) log storage space for a persisted log of recorded commands and operations, and ii) write cache space in a volatile memory cache for storing write data having corresponding recorded writes I/Os that have not yet been flushed from a log, and wherein said changing modifies the first current replication setting for the first stretched volume from the first replication level, denoting the high service level, to the second replication level, denoting the medium service level.

4. The computer-implemented method of claim 3, wherein said specifying specifies the high service level as the first current replication setting for the first stretched, and results in performing optimizations for asynchronous replication of said first stretched volume at the high service level, wherein the optimizations include:
   performing write tracking in memory or cache for said first stretched volume, wherein said write tracking tracks locations of said first stretched volume that are written to between successive transient snapshots of the respective source volume of said first stretched volume;
   retaining, in a log, a first log record to create a first transient snapshot of the respective source volume of said first stretched volume;
   retaining, in the log, first write records of first write I/Os directed to said first stretched volume, where said first write I/Os are recorded in the log after the first log record; and
   retaining, in a cache of the source system until replicated, all data which is written to said respective source volume of said first stretched volume and which is to be asynchronously replicated to the target system.

5. The computer-implemented method of claim 4, further comprising:
   recording, in the log, a second log record to delete the first transient snapshot of said first stretched volume, where the second log record is included in the log after the first write records of the first write I/Os; and
   while the first log record to create the first transient snapshot and the second log record have not been flushed from the log, invaliding the first transient snapshot responsive to detecting the second log record, wherein said invalidating thereby cancels creation of the first transient snapshot.

6. The computer-implemented method of claim 5, wherein said invalidating the first transient snapshot allows the first write records to be flushed from the log, and wherein the method includes:

subsequent to said invalidating, flushing the first write records from the log to the respective source volume of said first stretched volume.

7. The computer-implemented method of claim 5, wherein the first log record is recorded in the log responsive to a first command or request to create the first transient snapshot, wherein the first command or request is from a replication service that performs asynchronous replication for said first stretched volume when the first current replication setting for the first stretched volume is set to the high service level, and wherein the second log record is recorded in the log responsive to a second command or request to delete the first transient snapshot, wherein the second command or request is from the replication service that performs asynchronous replication for said first stretched volume when the first current replication setting for the first stretched volume is set to the high service level.

8. The computer-implemented method of claim 3, wherein said changing includes setting the first current replication setting for the first stretched volume to the medium service level and results in performing optimizations for asynchronous replication of said first stretched volume at the medium service level, wherein the optimizations include:
performing write tracking in memory or cache for said first stretched volume, wherein said write tracking tracks locations of said first stretched volume that are written to between successive transient snapshots of the respective source volume of said first stretched volume; and
retaining, in a cache of the source system until replicated, all data which is written to said respective source volume of said first stretched volume and which is to be asynchronously replicated to the target system.

9. The computer-implemented method of claim 8, wherein the medium service level allows transient snapshots of the respective source volume of said first stretched volume to be flushed from a log.

10. The computer-implemented method of claim 9, comprising:
recording, in the log, a first log record to create a first transient snapshot of the respective source volume of said first stretched volume;
flushing the first log record from the log; and
responsive to said flushing the first log record, creating a first replication related snapshot of the respective source volume of said first stretched volume, including creating and/or updating one or more metadata pages for the first replication related snapshot.

11. The computer-implemented method of claim 10, wherein the first log record is recorded in the log responsive to a first command or request to create the first transient snapshot, wherein the first command or request is from a replication service that performs asynchronous replication for said first stretched volume, and wherein after flushing the first log record and creating the first replication related snapshot of the respective source volume of said first stretched volume, the method includes:
the replication service issuing a second command or request to delete the first replication related snapshot; and
responsive to the second command or request, deleting the first replication related snapshot, including deleting and/or updating one or more metadata pages for the first replication related snapshot.

12. The computer-implemented method of claim 2, wherein the first resource is read cache space in a volatile memory cache for storing data having corresponding recorded writes I/Os that have been flushed from a log, and wherein said changing modifies the first current replication setting for the first stretched volume from the first replication setting, denoting any of the high service level and the medium service level, to the second replication level, denoting the low service level.

13. The computer-implemented method of claim 12, wherein specifying the low service level as the first current replication setting for the first stretched volume results in performing optimizations for asynchronous replication of said first stretched volume, wherein the optimizations include:
performing write tracking in memory or cache for said first stretched volume, wherein said write tracking tracks locations of said first stretched volume that are written to between successive transient snapshots of the respective source volume of said first stretched volume.

14. The computer-implemented method of claim 13, wherein the low service level allows transient snapshots of the respective source volume of said first stretched volume to be flushed from a log, and wherein the low service level allows first content of the respective source volume of the first stretched volume, that is to be replicated, to be evicted from a cache of the source system such that at least some of the first content to be replicated is not in the cache and results in a read cache miss, and wherein the method includes:
responsive to the read cache miss, obtaining the at least some of the first content to be replicated from backend non-volatile storage.

15. The computer-implemented method of claim 14, comprising:
recording, in the log, a first log record to create a first transient snapshot of the respective source volume of said first stretched volume;
flushing the first log record from the log; and
responsive to said flushing the first log record, creating a first replication related snapshot of the respective source volume of said first stretched volume, including creating and/or updating one or more metadata pages for the first replication related snapshot.

16. The computer-implemented method of claim 15, wherein the first log record is recorded in the log responsive to a first command or request to create the first transient snapshot, wherein the first command or request is from a replication service that performs asynchronous replication for said first stretched volume, and wherein after flushing the first log record and creating the first replication related snapshot of the respective source volume of said first stretched volume, the method includes:
the replication service issuing a second command or request to delete the first replication related snapshot; and
responsive to the second command or request, deleting the first replication related snapshot, including deleting and/or updating one or more metadata pages for the first replication related snapshot.

17. The computer-implemented method of claim 2, wherein the first resource is write tracking cache space in a volatile memory cache for storing locations of volumes that have been modified in corresponding asynchronous replication cycles, and wherein said changing modifies the first current replication setting for the first stretched volume from the first replication setting, that is any of the high service level, the medium service level and the low service level, to the second replication level, denoting the off service level that turns off all optimizations for asynchronous replication.

18. A non-transitory computer-readable media comprising code stored thereon that, when executed, performs a method comprising:
- configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume;
- specifying a plurality of current replication settings for the plurality of stretched volumes, wherein each of the plurality of replication settings denotes one of a plurality of replication service levels selected for a corresponding one of the plurality of stretched volumes, wherein each of the plurality of replication service levels denotes a different level of optimization performed for asynchronous replication;
- performing asynchronous replication for the plurality of stretched volumes in accordance with the plurality of replication current replication settings;
- monitoring resource consumption of one or more resources consumed during asynchronous replication processing, wherein said monitoring includes:
  - monitoring a first amount of a first resource of the one or more resources, wherein the first amount denotes a current amount of the first resource that is free and available for use; and
- responsive to determining that the first amount of the first resource is below a first minimum threshold, performing a corrective action to increase the current amount of the first resource that is free, wherein the plurality of replication service levels includes a first replication service level and a second replication service level, and wherein the corrective action includes:
  - changing a first current replication setting of the plurality of current replication settings for a first stretched volume of the plurality of stretched volumes from the first replication service level to the second replication service level, wherein the second replication service level is expected to consume less of the first resource than the first replication service level when performing asynchronous replication for the first stretched volume.

19. A system comprising:
one or more processors; and
a memory comprising code stored thereon that, when executed, performs a method comprising:
- configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume;
- specifying a plurality of current replication settings for the plurality of stretched volumes, wherein each of the plurality of replication settings denotes one of a plurality of replication service levels selected for a corresponding one of the plurality of stretched volumes, wherein each of the plurality of replication service levels denotes a different level of optimization performed for asynchronous replication;
- performing asynchronous replication for the plurality of stretched volumes in accordance with the plurality of replication current replication settings;
- monitoring resource consumption of one or more resources consumed during asynchronous replication processing, wherein said monitoring includes:
  - monitoring a first amount of a first resource of the one or more resources, wherein the first amount denotes a current amount of the first resource that is free and available for use; and
- responsive to determining that the first amount of the first resource is below a first minimum threshold, performing a corrective action to increase the current amount of the first resource that is free, wherein the plurality of replication service levels includes a first replication service level and a second replication service level, and wherein the corrective action includes:
  - changing a first current replication setting of the plurality of current replication settings for a first stretched volume of the plurality of stretched volumes from the first replication service level to the second replication service level, wherein the second replication service level is expected to consume less of the first resource than the first replication service level when performing asynchronous replication for the first stretched volume.

* * * * *